(12) United States Patent
Kondo et al.

(10) Patent No.: US 7,085,318 B2
(45) Date of Patent: *Aug. 1, 2006

(54) IMAGE PROCESSING SYSTEM, IMAGE PROCESSING METHOD, PROGRAM, AND RECORDING MEDIUM

(75) Inventors: Tetsujiro Kondo, Tokyo (JP); Hisakazu Shiraki, Kanagawa (JP); Yasunobu Node, Tokyo (JP); Katsuhisa Shinmei, Tokyo (JP)

(73) Assignee: Sony Corporation, Tokyo (JP)

(*) Notice: Subject to any disclaimer, the term of this patent is extended or adjusted under 35 U.S.C. 154(b) by 717 days.

This patent is subject to a terminal disclaimer.

(21) Appl. No.: 10/049,553

(22) PCT Filed: Jun. 15, 2001

(86) PCT No.: PCT/JP01/05117

§ 371 (c)(1),
(2), (4) Date: Nov. 18, 2002

(87) PCT Pub. No.: WO01/97510

PCT Pub. Date: Dec. 20, 2001

(65) Prior Publication Data

US 2003/0122967 A1  Jul. 3, 2003

(30) Foreign Application Priority Data

Jun. 15, 2000 (JP) ............................. 2000-179341
Jun. 15, 2000 (JP) ............................. 2000-179342

(51) Int. Cl.
*H04N 7/12* (2006.01)

(52) U.S. Cl. ........................ 375/240.01; 375/240.08

(58) Field of Classification Search ........... 375/240.01, 375/240.08, 240.16, 240.22; 348/416.1, 348/418.1, 413.1, 459; 382/236, 284, 298
See application file for complete search history.

(56) References Cited

U.S. PATENT DOCUMENTS

| 6,148,108 A | * | 11/2000 | Nishikawa | ............ | 382/236 |
| 6,215,914 B1 | * | 4/2001 | Nakamura et al. | ............ | 382/284 |
| 6,707,502 B1 | * | 3/2004 | Kondo et al. | ............ | 348/459 |
| 2003/0035594 A1 | * | 2/2003 | Kondo et al. | ............ | 382/298 |

FOREIGN PATENT DOCUMENTS

JP  1-143583  6/1989

(Continued)

*Primary Examiner*—Gims Philippe
(74) *Attorney, Agent, or Firm*—Frommer Lawrence & Haug LLP; William S. Frommer

(57) ABSTRACT

A picture processing apparatus for generating an output picture signal with higher quality than the input picture signal. A first signal processor has a storage device for storing a picture signal with the same quality as the output picture signal. The input picture signal and the stored picture signal are added to generate a first picture signal with higher quality than the input picture, which is stored in the storage device. A second signal processor performs a class categorizing adaptive process by extracting a feature of the input picture signal corresponding to the position of a considered pixel of the output picture signal, categorizing the considered pixel as one of a plurality of classes corresponding to the feature, and calculating the input picture signal using a predetermined calculating method corresponding to the categorized class, thereby generating a second picture signal with higher quality than the input picture signal. One of the first and second picture signals is selected as the output picture signal.

52 Claims, 28 Drawing Sheets

FOREIGN PATENT DOCUMENTS

| | | |
|---|---|---|
| JP | 4-101579 | 4/1992 |
| JP | 6-121194 | 4/1994 |
| JP | 11-4415 | 1/1999 |
| JP | 2000-59652 | 2/2000 |

* cited by examiner

|  | f[−1] | f[0] | f[+1] |
|---|---|---|---|
| *Fig. 7A* |  |  |  |
| *Fig. 7B* | 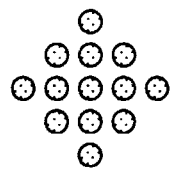 | 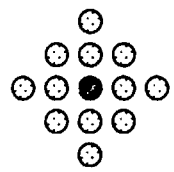 | 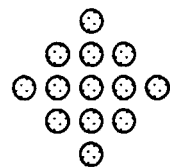 |
| *Fig. 7C* | 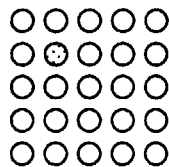 | 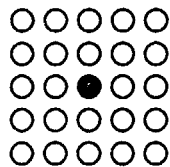 | 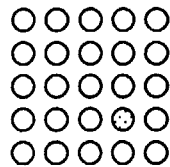 |
| *Fig. 7D* | 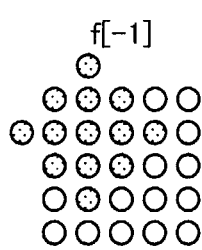 | 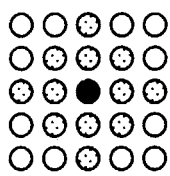 | 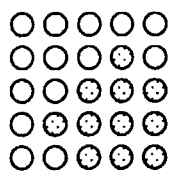 |
| *Fig. 7E* | (−1, −1) | (0, 0) | (1, 1) |

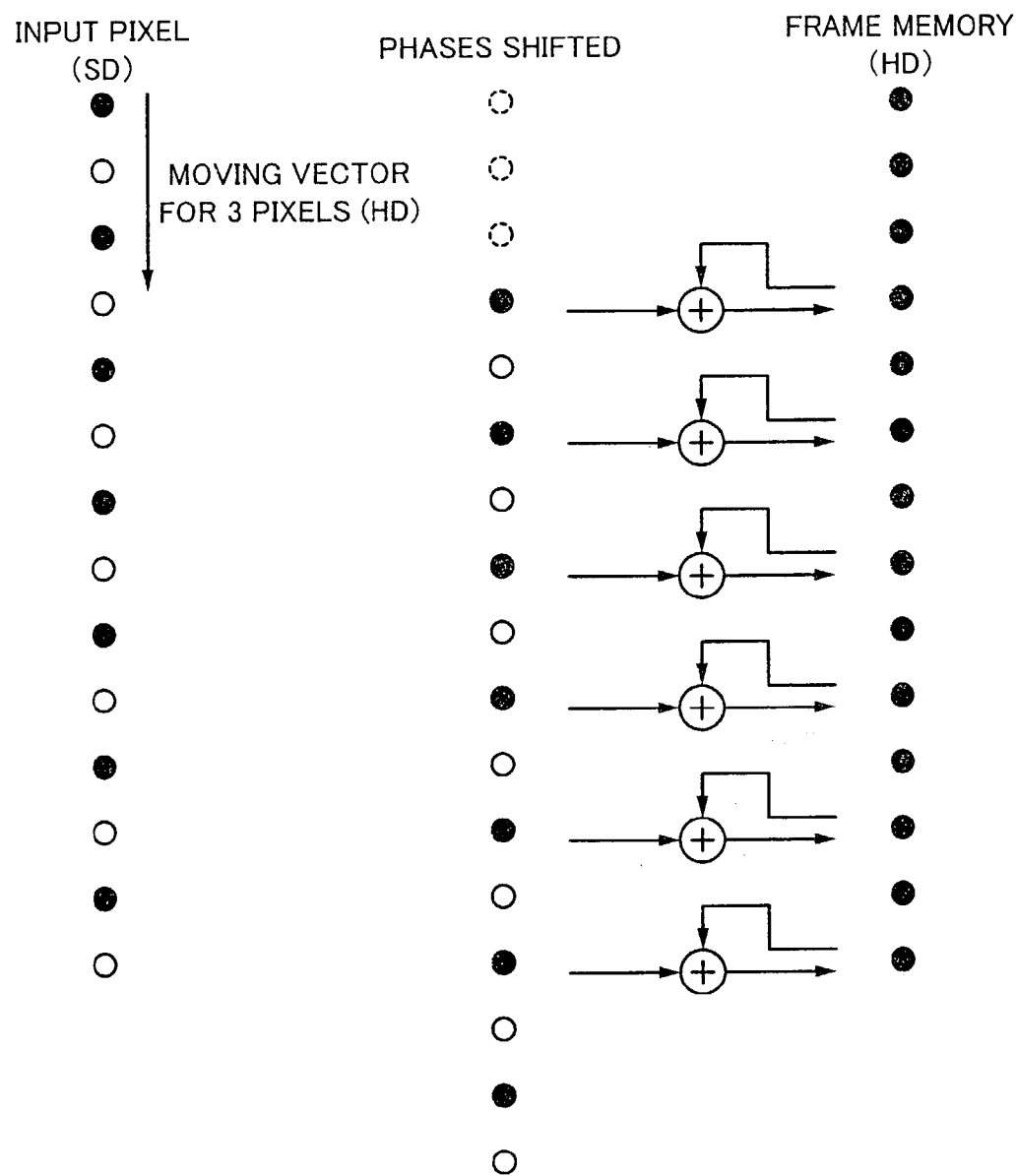

*Fig. 20*
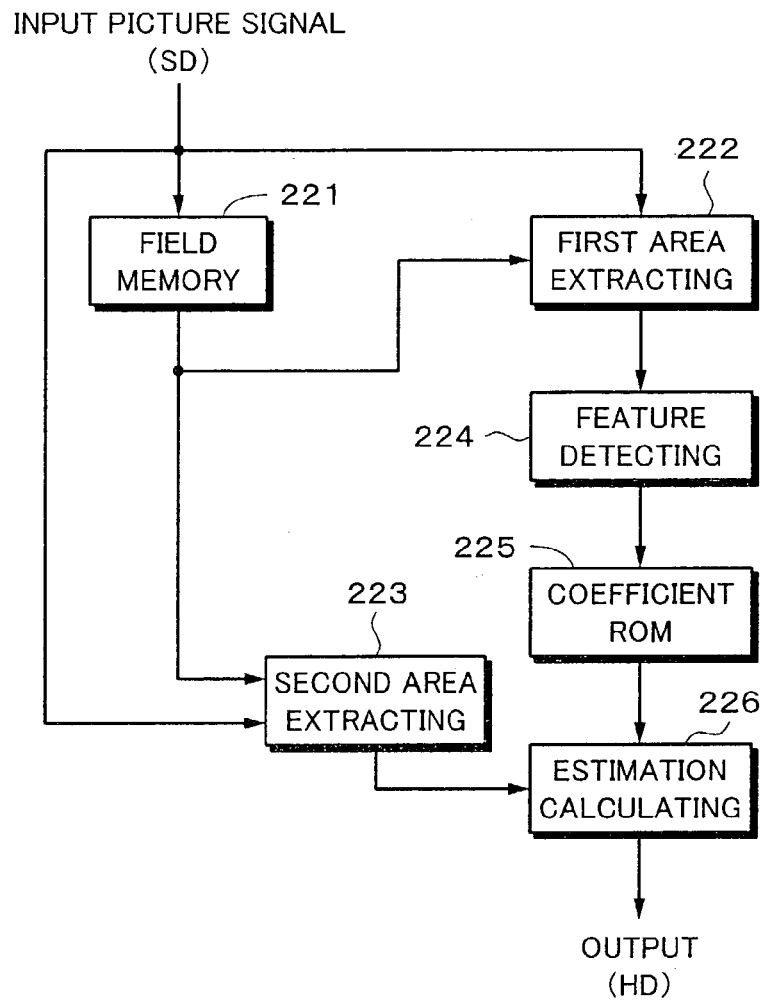
*Fig. 21A*  *Fig. 21B*
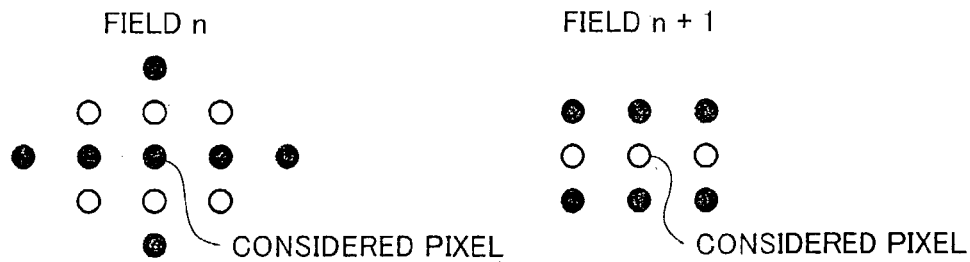

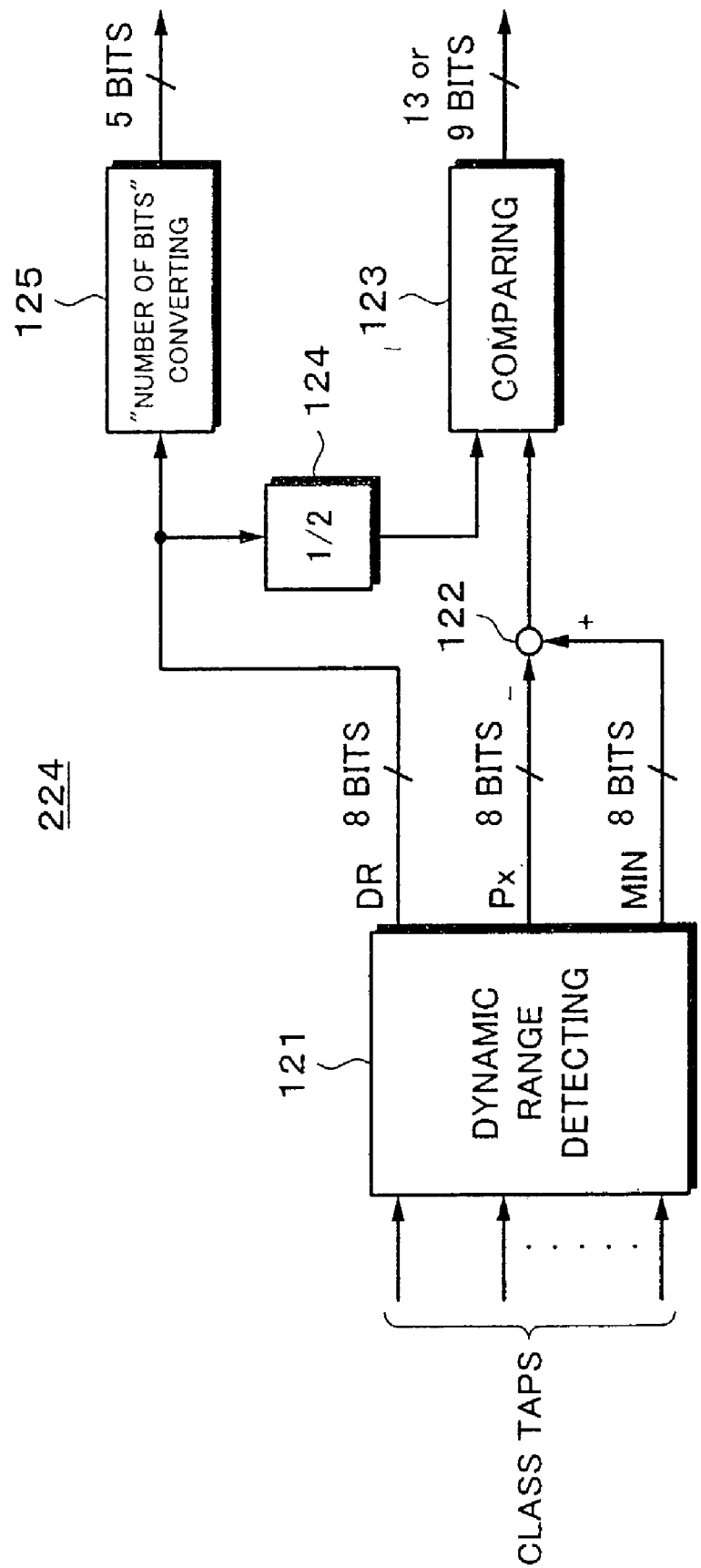

NORMAL OUTPUT OF HD

OUTPUT OF CLASS CATEGORIZING ADAPTIVE PROCESS

OUTPUT BY HIGH DENSITY STORAGE

IMAGE PROCESSING SYSTEM, IMAGE PROCESSING METHOD, PROGRAM, AND RECORDING MEDIUM

TECHNICAL FIELD

The present invention relates to a picture processing apparatus, a picture processing method, a program, and a record medium applicable to a noise eliminating apparatus and a noise eliminating method for eliminating noise of for example a picture signal and to a picture converting apparatus and a picture converting method for converting an input picture signal into a picture signal with a higher resolution than the input picture signal.

BACKGROUND ART

Picture signal processing apparatuses are categorized as two types. The first type is an apparatus having a structure of which a picture signal is stored as time elapses. The second type is an apparatus using a class categorizing adaptive process proposed by the applicant of the present invention. Exemplifying a noise eliminating process, FIG. 1 shows the structure of which a picture signal is stored as time elapses. This structure is known as a motion adaptive type recursive filter.

An input picture signal is supplied to an adding circuit 2 through an amplifier 1 that adjusts the amplitude of the input picture signal in such a manner that one pixel is supplied at a time. An output picture signal of a frame that immediately precedes the current frame (namely, the current frame of an input picture signal (hereinafter referred to as current frame) has been stored in a frame memory 3. (The frame that immediately precedes the current frame is referred to as preceding frame.) The picture signal stored in the frame memory 3 is read successively pixel by pixel corresponding to pixel positions of the input picture signal and supplied to the adding circuit 2 through an amplifier 4 that adjusts the amplitude of the picture signal.

The adding circuit 2 adds a pixel of the current frame that is output from the amplifier 1 and a pixel of the preceding frame that is output from the amplifier 4 and outputs the added output as an output picture signal. In addition, the adding circuit 2 outputs the added output to the frame memory 3. The frame memory 3 rewrites the picture signal stored therein with the output picture signal of the adding circuit 2.

In addition, the input picture signal of the current frame is supplied pixel by pixel to a subtracting circuit 5. The picture signal of the preceding frame stored in the frame memory 3 is read pixel by pixel corresponding to the pixel positions of the input picture signal and supplied to the subtracting circuit 5. The subtracting circuit 5 outputs the difference between the pixel values of pixels at corresponding positions of pictures of the current frame and the preceding frame.

The difference that is output from the subtracting circuit 5 is supplied to an absolute value calculating circuit 6. The absolute value calculating circuit 6 calculates the absolute value of the difference that is output from the subtracting circuit 5. The calculated absolute value is supplied to a threshold value processing circuit 7. The threshold value processing circuit 7 compares the absolute value of the supplied difference of the pixel values with a predetermined threshold value and determines whether each pixel is a moving portion or a still portion. When the absolute value of the difference of the pixel values is smaller than the threshold value, the threshold value processing circuit 7 determines that the input pixel is a still portion. In contrast, when the absolute value of the difference of the pixel values is larger than the threshold value, the threshold value processing circuit 7 determines that the input pixel is a moving portion.

The determined result representing whether the input pixel is a still portion or a moving portion is supplied from the threshold value processing circuit 7 to a weighting coefficient generating circuit 8. The weighting coefficient generating circuit 8 designates a value of a weighting coefficient ($0 \leq k \leq 1$) corresponding to the determined result of the threshold value processing circuit 7 and supplies the designated coefficient k to the amplifier 1. In addition, the weighting coefficient generating circuit 8 supplies a coefficient (1−k) to the amplifier 4. The amplifier 1 multiplies the input signal by k. In contrast, the amplifier 4 multiplies the input signal by (1−k).

In this case, when the determined result of the threshold value processing circuit 7 represents that the pixel of the current frame is a still pixel, a constant value in the range of k=0 to 0.5 is designated as the value of the coefficient k. Thus, the output of the adding circuit 2 is a value of which the pixel values of the current frame and the preceding frame that have been weighted and added.

On the other hand, when the determined value of the threshold value processing circuit 7 represents that the pixel of the current frame is a moving portion, k=1 is designated as the value of the coefficient k. Thus, the adding circuit 2 outputs the pixel value of the current frame (namely, the pixel value of the input picture signal).

The stored signal of the frame memory 3 is rewritten frame by frame with the output picture signal of the adding circuit 2. Thus, a still portion of the picture signal stored in the frame memory 3 is a cumulated value of pixel values of a plurality of frames. Thus, assuming that noise varies in each frame at random, when weighted additions are performed, the noise gradually becomes small and is finally eliminated. Thus, noise is eliminated from a still portion of a picture signal stored in the frame memory 3 (the still portion is the same as an output picture signal).

However, when noise is eliminated using the motion adaptive type recursive filter, the following problems arise.

When a noise level is large, a moving portion may be mistakenly detected as a still portion. In this case, the picture quality may deteriorate (for example, the picture may become unsharp). In addition, noise cannot be eliminated from a moving portion.

On the other hand, a noise eliminating apparatus using the class categorizing adaptive process has been proposed by the applicant of the present invention. In the class categorizing adaptive process, noise can be eliminated regardless of whether a pixel of a still portion or a moving portion. However, the motion adaptive type recursive filter has a higher noise eliminating performance than the noise eliminating apparatus using the class categorizing adaptive process.

Besides the noise eliminating process, the present invention can be effectively applied for a resolution converting apparatus that increases the resolution of an input picture signal.

In other words, at present, there are a variety of television systems that are for example so-called standard systems of which the number of scanning lines per frame is 525 or 625 and high resolution systems of which the number of scanning lines per frame is larger than that of the standard systems (for example, high vision system using 1125 scanning lines).

In this case, to allow an apparatus corresponding to for example a high resolution system to handle a picture signal corresponding to the standard system, it is necessary to convert a picture signal with a resolution corresponding to the standard system into a picture signal with a resolution corresponding to the high resolution system (this process is sometimes referred to as upconvert). To solve such a problem, various types of resolution converting apparatuses using linear interpolating method and so forth have been proposed. For example, upconvert using storage type process and upconvert using class categorizing adaptive process have been proposed.

In a resolution converting apparatus using storage type process that outputs a converted output picture, although a still picture portion less deteriorates, a large moving portion deteriorates. On the other hand, in a resolution converting apparatus using class categorizing adaptive process that outputs a converted output picture, although a moving picture portion less deteriorates, a still picture portion deteriorates.

In other words, so far, it was difficult to accomplish a resolution converting apparatus that can form a picture that less deteriorates for both a still picture portion and a moving picture portion.

Thus, an object of the present invention is to provide a picture processing apparatus, a picture processing method, a program, and a record medium that allow an advantage of a structure of which a picture signal is stored as time elapses and an advantage of a structure of which a class categorizing adaptive process is used to be effectively used so as to perform a good process as a whole.

DISCLOSURE OF THE INVENTION

Claim 1 of the present invention is a picture processing apparatus for receiving an input picture signal and generating an output picture signal with higher quality than the input picture signal, comprising:

a first signal processing means, having storing means for storing a picture signal with the same quality as the output picture signal, the first signal processing means adding the input picture signal and the picture signal stored in the storing means so as to generate a first picture signal with higher quality than the input picture and store the first picture signal to the storing means;

a second signal processing means for extracting a feature of the input picture signal corresponding to the position of a considered pixel of the output picture signal, categorizing the considered pixel as one of a plurality of classes corresponding to the feature, and calculating the input picture signal using a predetermined calculating method corresponding to the categorized class so as to generate a second picture signal with higher quality than the input picture signal; and an output selecting means for performing a determination for the first picture signal and the second picture signal and selecting one of the first picture signal and the second picture signal as the output picture signal.

Claim 26 of the present invention is a picture processing method for receiving an input picture signal and generating an output picture signal with higher quality than the input picture signal, comprising the steps of:

storing a picture signal with the same quality as the output picture signal to storing means, adding the input picture signal and the picture signal stored in the storing means so as to generate a first picture signal with higher quality than the input picture and store the first picture signal to the storing means;

extracting a feature of the input picture signal corresponding to the position of a considered pixel of the output picture signal, categorizing the considered pixel as one of a plurality of classes corresponding to the feature, and calculating the input picture signal using a predetermined calculating method corresponding to the categorized class so as to generate a second picture signal with higher quality than the input picture signal; and performing a determination for the first picture signal and the second picture signal and selecting one of the first picture signal and the second picture signal as the output picture signal.

Claim 51 of the present invention is a program for causing a computer to execute a picture process for generating an output picture signal with higher quality than an input picture signal, the picture process comprising the steps of:

storing a picture signal with the same quality as the output picture signal to storing means, adding the input picture signal and the picture signal stored in the storing means so as to generate a first picture signal with higher quality than the input picture and store the first picture signal to the storing means;

extracting a feature of the input picture signal corresponding to the position of a considered pixel of the output picture signal, categorizing the considered pixel as one of a plurality of classes corresponding to the feature, and calculating the input picture signal using a predetermined calculating method corresponding to the categorized class so as to generate a second picture signal with higher quality than the input picture signal; and performing a determination for the first picture signal and the second picture signal and selecting one of the first picture signal and the second picture signal as the output picture signal.

Claim 52 of the present invention is a computer readable record medium on which a program has been recorded, the program causing the computer to execute a picture process for generating an output picture signal with higher quality than an input picture signal, the picture process comprising the steps of:

storing a picture signal with the same quality as the output picture signal to storing means, adding the input picture signal and the picture signal stored in the storing means so as to generate a first picture signal with higher quality than the input picture and store the first picture signal to the storing means;

extracting a feature of the input picture signal corresponding to the position of a considered pixel of the output picture signal, categorizing the considered pixel as one of a plurality of classes corresponding to the feature, and calculating the input picture signal using a predetermined calculating method corresponding to the categorized class so as to generate a second picture signal with higher quality than the input picture signal; and performing a determination for the first picture signal and the second picture signal and selecting one of the first picture signal and the second picture signal as the output picture signal.

BRIEF DESCRIPTION OF DRAWINGS

FIG. 7 is a schematic diagram showing examples of class taps and predictive taps.

FIG. 19 is a schematic diagram for explaining the converting process of the resolution converting portion using the storage type process.

FIG. 20 is a block diagram showing the structure of an example of a resolution converting portion using the class categorizing adaptive process.

FIG. 21 is schematic diagram for explaining a process and an operation of the resolution converting portion using the class categorizing adaptive process.

FIG. 22 is a block diagram showing an example of a feature detecting circuit of the resolution converting portion using the class categorizing adaptive process.

BEST MODES FOR CARRYING OUT THE INVENTION

Figure 2:
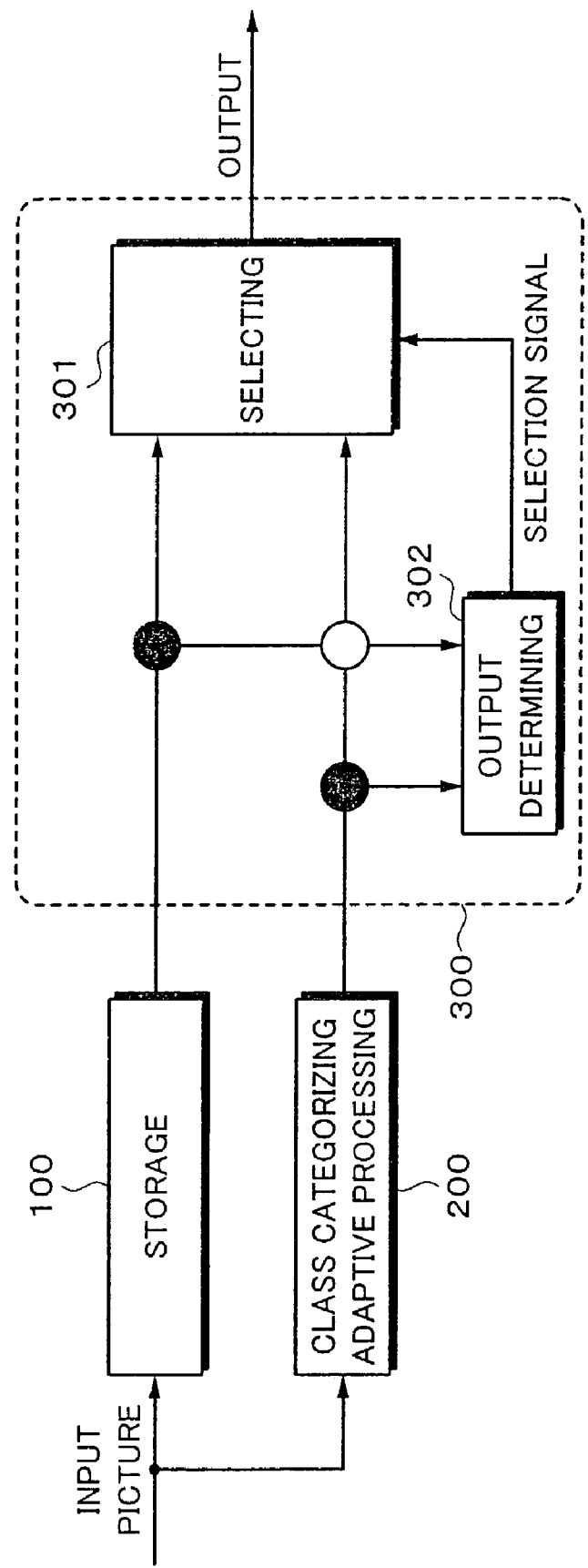
FIG. 2 is a block diagram showing the basic structure of the present invention.

FIG. 2 shows the overall structure of the present invention. An input picture signal is supplied to a storage type processing portion 100 and a class categorizing adaptive processing portion 200. The storage type processing portion 100 is a processing portion that has the structure for storing a picture signal as time elapses. In contrast, the class categorizing adaptive processing portion 200 detects a feature of an input picture signal corresponding to the position of a considered pixel of an output picture signal, categorizes the considered pixel as one of a plurality of classes corresponding to the detected feature, and calculates the input picture signal using a predetermined calculating system corresponding to the categorized class so as to generate the output picture signal.

An output picture signal of the storage type processing portion 100 and an output picture signal of the class categorizing adaptive processing portion 200 are supplied to a selecting circuit 301 and an output determining circuit 302 of an output selecting portion 300. The output determining circuit 302 determines one of the output picture signals to be output corresponding to output picture signals of the processing portions. The output determining circuit 302 generates a selection signal corresponding to the determined result. The selection signal is supplied to the selecting circuit 301. The selecting circuit 301 selects one of the two output picture signals corresponding to the selection signal.

When the present invention is applied to a noise elimination, the storage type processing portion 100 has the same structure as the above-mentioned motion adaptive type recursive filter. By performing the weighted additions of the current frame and the preceding frame, noise is adequately eliminated from pixels of a still portion.

On the other hand, the class categorizing adaptive processing portion 200 is a noise eliminating portion using the class categorizing adaptive process. The noise eliminating portion using the class categorizing adaptive process extracts pixels at corresponding positions of a plurality of frames, categorizes noise components of pixels as classes corresponding to variation of pixels among the frames, and eliminates the noise components from the input picture signal by predetermined calculating processes-corresponding to the categorized classes. Thus, noise is eliminated from an input picture signal regardless of whether it is a moving portion or a still portion. However, when the input picture signal is a perfect still portion, the storage type noise eliminating portion can more effectively eliminate noise therefrom than the noise eliminating portion using the class categorizing adaptive process.

The output selecting portion 300 determines whether an input picture signal in the unit of a predetermined number of pixels is a still portion or a moving portion. When the determined result represents that the input picture signal is a still portion, the output selecting portion 300 selects an output picture signal of the noise eliminating portion using the storage type process. When the determined result represents that the input picture signal is a moving portion, the output selecting portion 300 selects an output picture signal of the noise eliminating portion using the class categorizing adaptive process. Thus, an output picture signal of which noise has been eliminated is obtained regardless of whether an input picture signal is a still portion or a moving portion.

When the present invention is applied to a resolution converting apparatus that up-converts a picture signal, the storage type processing portion 100 stores picture information to a frame memory in the chronological direction for a long time so as to form a picture signal with a high resolution. When an input picture is a still picture or a full screen that simply pans or tilts, with such a structure, a converted picture signal that less deteriorates can be obtained.

On the other hand, the class categorizing adaptive processing portion 200 is a resolution converting portion using the class categorizing adaptive process. The resolution converting portion categorizes a feature of a considered pixel of a picture of an input picture signal as a class corresponding to features of a plurality of pixels including the considered pixel and pixels chronologically and spatially adjacent thereto and generates a plurality of pixels of a picture with a high resolution corresponding to the considered pixel by a predetermined picture conversion calculating process predesignated corresponding to the categorized class so as to generate an output picture signal with a high resolution. Thus, when an input picture signal is a moving portion, the resolution converting portion using the class categorizing adaptive process can obtain a converted output picture signal that less deteriorates. However, when an input picture signal is a still portion, the storage type resolution converting portion that handles a picture signal in the chronological direction for a long time can more adequately convert the resolution than the resolution converting portion using the class categorizing adaptive process.

In consideration of characteristics of those resolution converting portions, the output selecting portion 300 can select a picture signal that is output from one resolution converting portion or a picture signal that is output from the other resolution converting portion and outputs the selected picture signal. Thus, a converted output picture with high picture quality that less deteriorates can be obtained.

Figure 3:
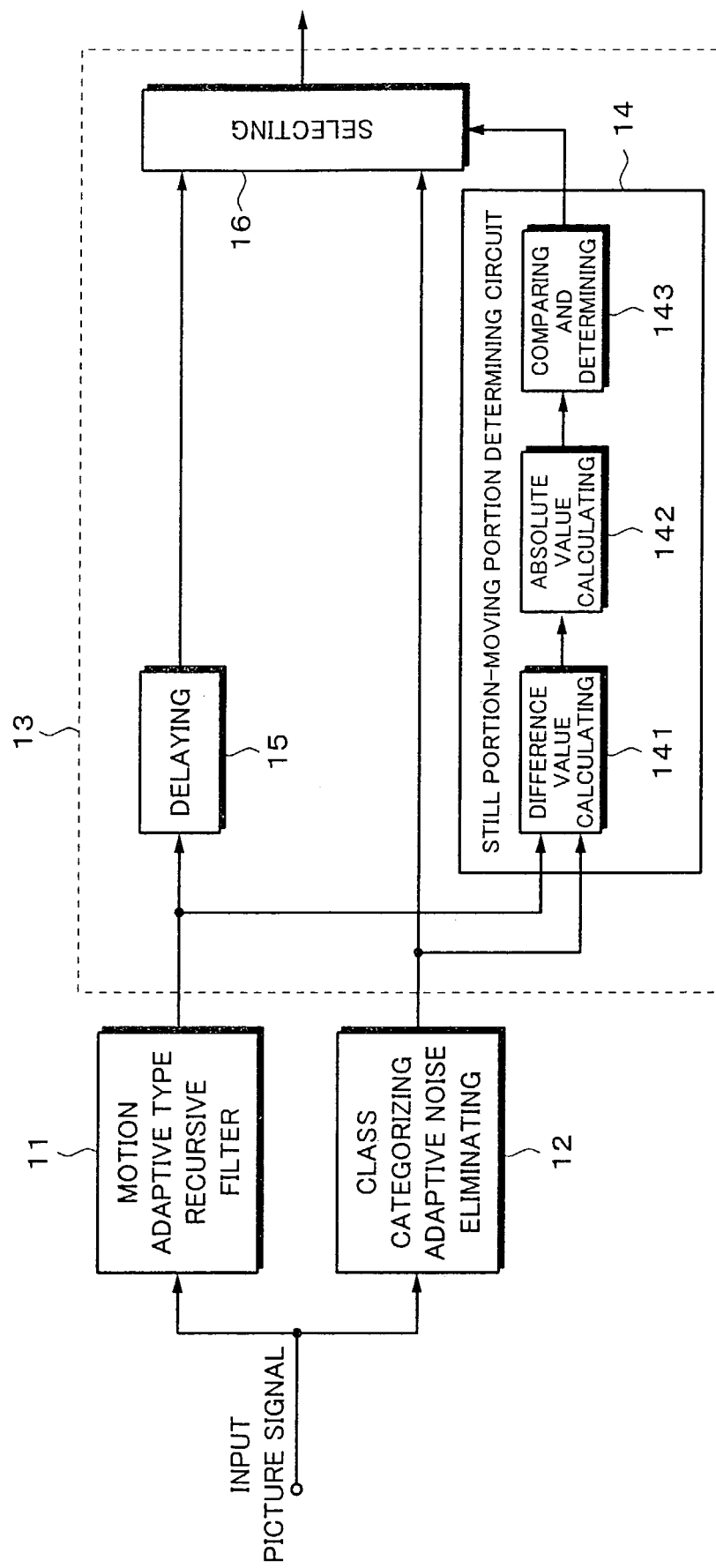
FIG. 3 is a block diagram showing an embodiment of the present invention.

Next, with reference to FIG. 3, a noise eliminating apparatus according to the embodiment of the present invention will be described. An input picture signal is supplied pixel by pixel to a motion adaptive type recursive filter 11 that composes an example of the storage type processing portion 100. In addition, the input picture signal is supplied to a class categorizing adaptive noise eliminating circuit 12 that composes an example of the class categorizing adaptive processing portion 200.

Figure 1:
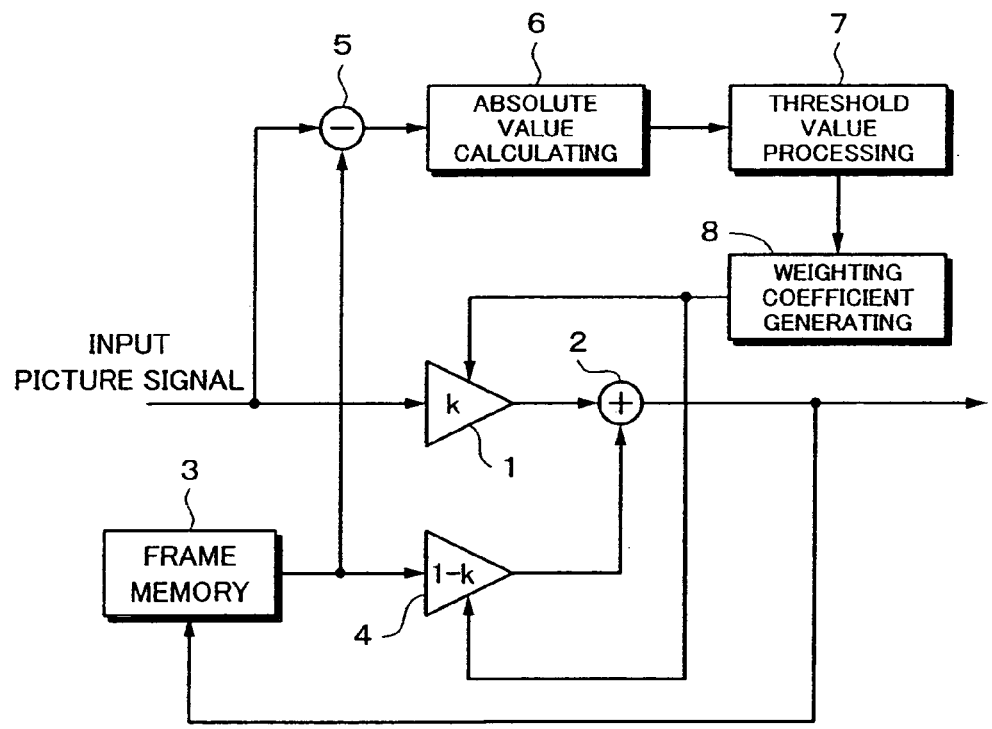
FIG. 1 is a block diagram showing an example of a conventional motion adaptive type recursive filter.

As the motion adaptive type recursive filter 11, the same structure as the example shown in FIG. 1 can be used. An output picture signal of the motion adaptive type recursive filter 11 is supplied to an output selecting portion 13 corresponding to the output selecting portion 300.

The class categorizing adaptive noise eliminating circuit 12 extracts pixels at corresponding positions of a plurality of frames, categorizes noise components of the pixels as classes corresponding to the variation of the pixels of the frames, and performs predetermined calculating processes corresponding to the categorized classes so as to generate an output picture signal of which noise components have been eliminated from the input picture signal. The detailed structure of the class categorizing adaptive noise eliminating circuit 12 will be described later. An output picture signal of the class categorizing adaptive noise eliminating circuit 12 is also supplied to the output selecting portion 13.

The output selecting portion 13 has a still portion—moving portion determining circuit 14, a timing adjustment delaying circuit 15, and a selecting circuit 16. An output picture signal of the motion adaptive type recursive filter 11 is supplied to the selecting circuit 16 through the delaying circuit 15. An output picture signal of the class categorizing adaptive noise eliminating circuit 12 is directly supplied to the selecting circuit 16.

The output picture signal of the motion adaptive type recursive filter 11 and the output picture signal of the class categorizing adaptive noise eliminating circuit 12 are supplied to the still portion—moving portion determining circuit 14. The still portion—moving portion determining circuit 14 determines whether the input picture signal is a still portion or a moving portion pixel by pixel corresponding to the two output picture signals of the motion adaptive type recursive filter 11 and the class categorizing adaptive noise eliminating circuit 12. The determined output of the still portion moving portion determining circuit 14 is supplied as a selection control signal to the selecting circuit 16.

As was described above, as for an output picture signal of the motion adaptive type recursive filter 11, noise is eliminated from a pixel of a still portion of a picture, whereas noise is not limited from a pixel of a moving portion of a picture. On other hand, as for an output picture signal of the class categorizing adaptive noise eliminating circuit 12, noise is eliminated regardless of whether a pixel of a picture is a still portion or a moving portion.

Thus, when the output picture signal of the motion adaptive type recursive filter 11 and the output picture signal of the class categorizing adaptive noise eliminating circuit 12 are compared, since noise is eliminated from still portions of those output picture signals, the pixel values thereof are almost the same. However, although noise remains in a moving portion of the output picture signal of the motion adaptive type recursive filter 11, noise is eliminated from a moving portion of the output picture signal of the class categorizing adaptive noise eliminating circuit 12. Thus, the pixel values of the moving portions of the output picture signals of the motion adaptive type recursive filter 11 and the class categorizing adaptive noise eliminating circuit 12 differ by the noise.

Using such characteristics, the still portion—moving portion determining circuit 14 determines whether each pixel of an input picture signal is a still portion or a moving portion. In other words, the still portion—moving portion determining circuit 14 has a difference value calculating circuit 141, an absolute value calculating circuit 142, and a comparing and determining circuit 143. The difference value calculating circuit 141 calculates the difference between a pixel value of the output picture signal of the motion adaptive type recursive filter 11 and a pixel value of the output picture signal of the class categorizing adaptive noise eliminating circuit 12. The absolute value calculating circuit 142 calculates the absolute value of the difference value that is output from the difference value calculating circuit 141.

When the absolute value of the difference value that is output from the absolute value calculating circuit 142 is larger than a predetermined value, the comparing and determining circuit 143 determines that the pixel is a moving portion. In contrast, when the absolute value of the difference value that is output from the absolute value calculating circuit 142 is smaller than the predetermined value, the comparing and determining circuit 143 determines that the pixel is a still portion. When the pixel is a still portion, the comparing and determining circuit 143 causes the selecting circuit 16 to select the output picture signal of the motion adaptive type recursive filter 11. In contrast, when the pixel is a moving portion, the comparing and determining circuit 143 causes the selecting circuit 16 to select the output picture signal of the class categorizing adaptive noise eliminating circuit 12.

Thus, when the pixel is a still portion, the selecting circuit 16 (namely, the output selecting portion 13) outputs the output picture signal of the motion adaptive type recursive filter that can store information of a long frame and adequately eliminates noise. In contrast, when the pixel is a moving portion, the selecting circuit 16 outputs the output picture signal of the class categorizing adaptive noise eliminating circuit 12 instead of the output picture signal of the adaptive type recursive filter. Thus, an output picture signal from which noise has been eliminated regardless of whether the pixel is a still portion or a moving portion can be obtained from the output selecting portion 13.

Figure 4:
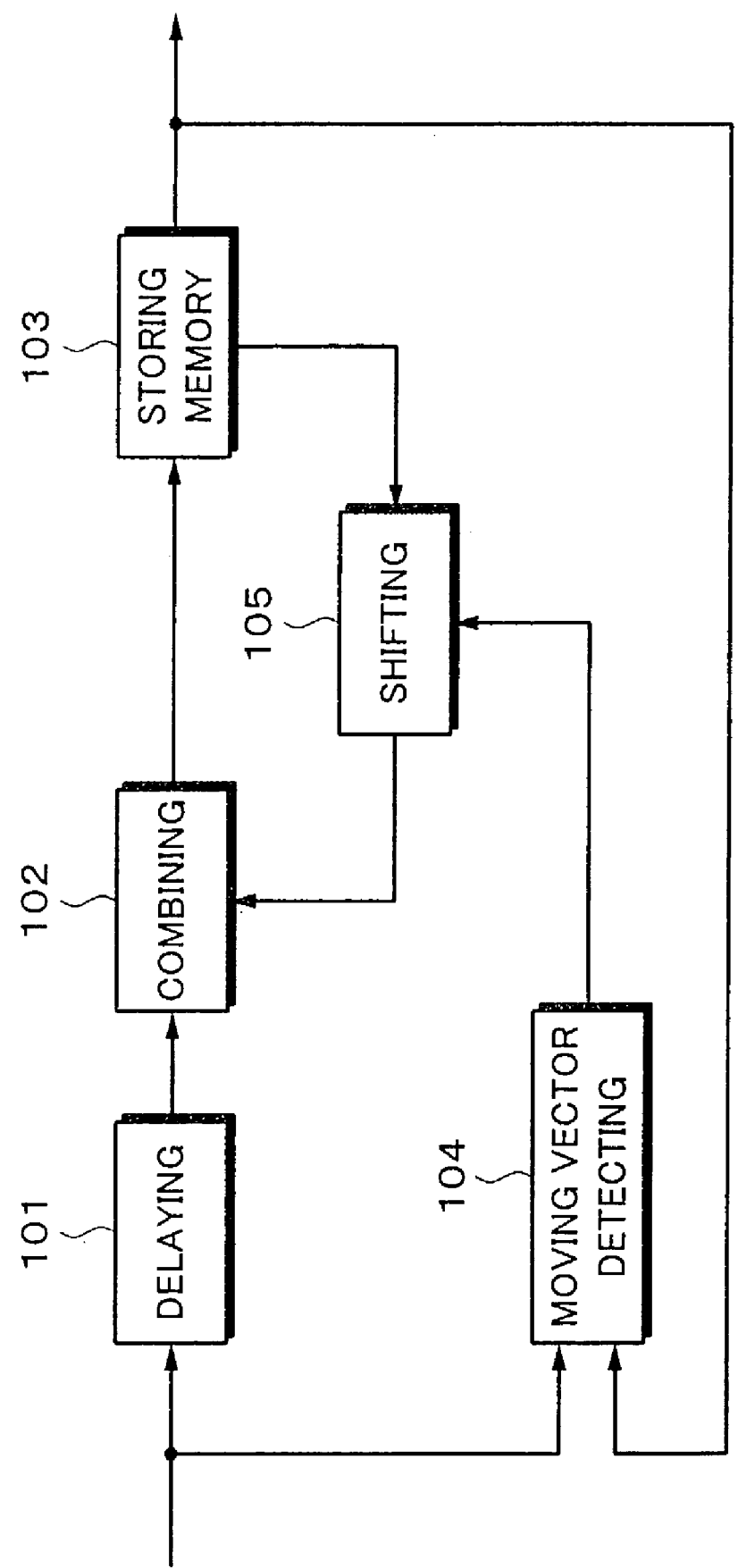
FIG. 4 is a block diagram showing an example of a noise eliminating circuit using a storage type process according to the embodiment of the present invention.

The structure of the motion adaptive type recursive filter 11 is not limited to an example shown in FIG. 1. In other word, the structure of the motion adaptive type recursive filter 11 may be as shown in FIG. 4. In FIG. 4, reference numeral 101 represents a time adjustment delaying circuit. Reference numeral 104 represents a moving vector detecting circuit. An input picture is supplied to a combining circuit 102 through the delaying circuit 101. A picture stored in a storing memory 103 is supplied to the combining circuit 102 through a shifting circuit 105. An combined output of the combining circuit 102 is stored in the storing memory 103. A picture stored in the storing memory 103 is extracted as an output and supplied to the vector detecting circuit 104.

The moving vector detecting circuit 104 detects a moving vector of the input picture signal and the picture stored in the storing memory 103. The shifting circuit 105 shifts the position of the picture that is read from the storing memory 103 in the horizontal direction and/or the vertical direction corresponding to the moving vector detected by the moving vector detecting circuit 104. The shifting circuit 105 compensates the motion of the picture. Thus, the combining circuit 102 adds pixels at spatially corresponding positions of the pictures as will be described later.

Combined value of output of combining circuit 102= (pixel value of input picture×N+pixel value of stored picture×M)/(N+M) (where N and M are predetermined coefficients).

Thus, pixel data of a plurality of frames is cumulatively stored in the storing memory 103. As a result, noise components that do not correlate to each other can be eliminated.

Figure 5:
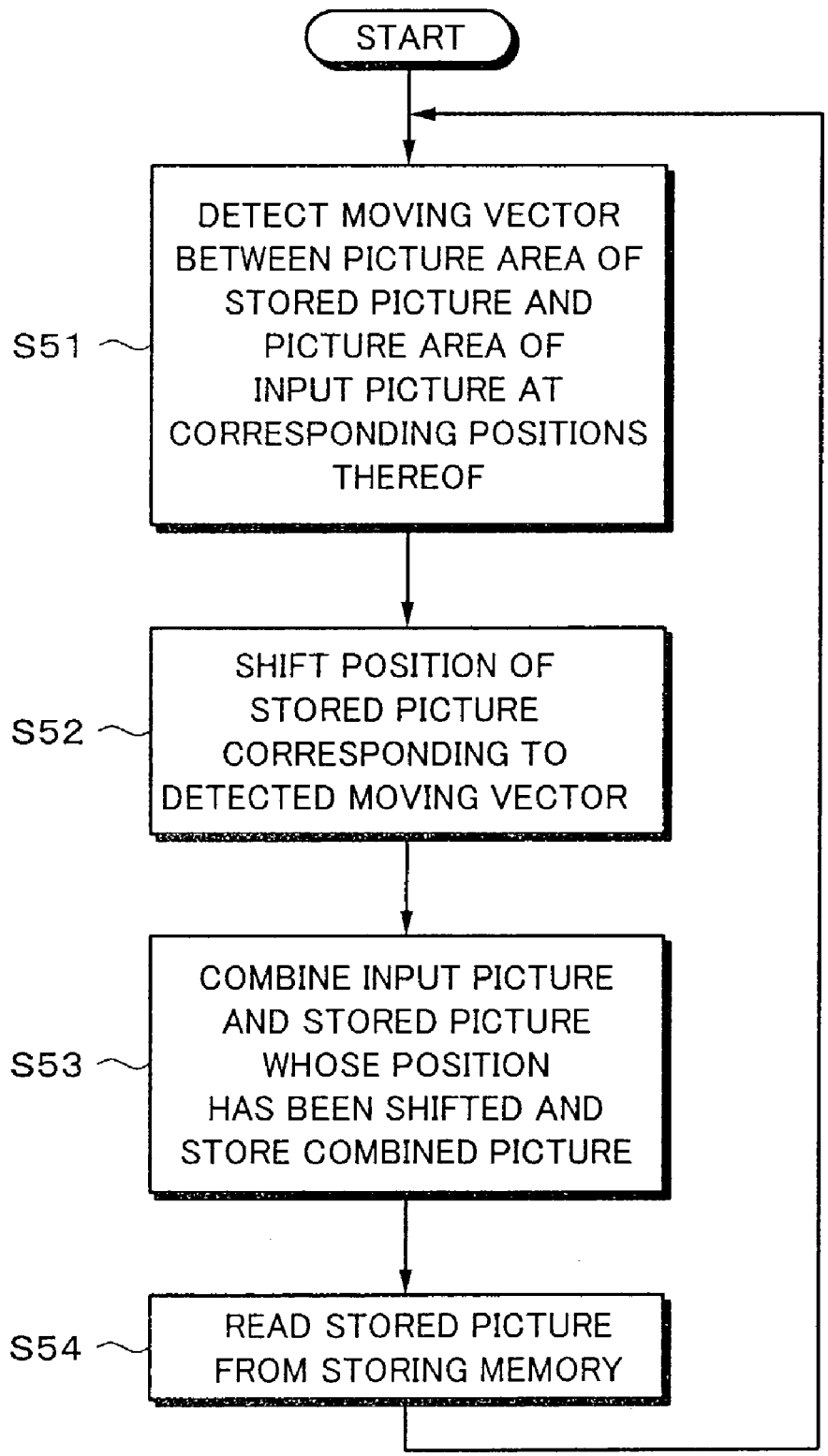
FIG. 5 is a flow chart showing a process of the example of the noise eliminating circuit using the storage type process according to the embodiment of the present invention.

FIG. 5 is a flow chart showing a software process that accomplishes the process of the structure shown in FIG. 4. First of all, at step S51, a moving vector is detected between a picture area of a stored picture and a picture area of an input picture at corresponding positions thereof. At step S52, corresponding to the detected moving vector, the position of the stored picture is shifted. The input picture and the stored picture whose position has been shifted are combined and stored (at step S53). At step S54, the stored picture is read from the storing memory and then output.

[Description of Class Categorizing Adaptive Noise Eliminating Circuit]

Next, the class categorizing adaptive noise eliminating circuit according to the embodiment will be described in detail. In the following example, as the class categorizing adaptive process, pixels are categorized as classes corresponding to a three-dimensional (chronological—spatial) distribution of the signal level of the input picture signal. Predictive coefficients that are pre-learnt for individual classes are stored in a memory. Optimally estimated values (namely, pixels values from which noise has been eliminated) are output by a calculating process as weighted additions using the obtained predictive coefficients.

In the example, the class categorizing adaptive process is performed in consideration of the motion of a picture so as to eliminate noise. In other words, corresponding to a motion estimated with an input picture signal, a pixel area to be referenced for detecting a noise component and a pixel area to be used for a calculating process for eliminating the noise are extracted. Corresponding to the extracted pixel areas, a picture from which noise has been eliminated by the class categorizing adaptive process is output.

Figure 6:
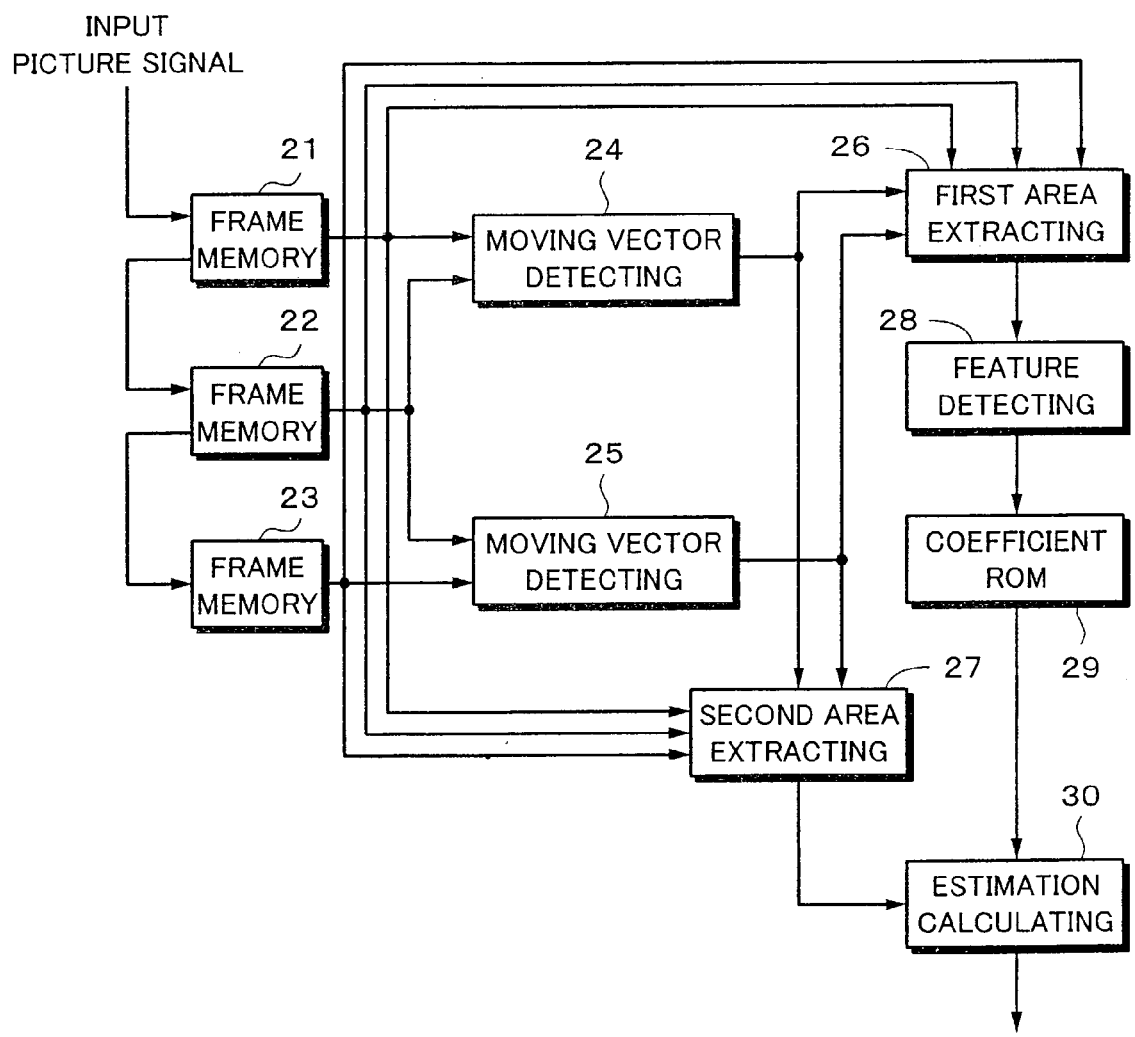
FIG. 6 is a block diagram showing an example of a class categorizing adaptive noise eliminating circuit according to the embodiment.

FIG. 6 shows the overall structure of the class categorizing adaptive noise eliminating circuit according to the embodiment.

An input picture signal to be processed is supplied to a frame memory 21. The frame memory 21 stores a picture of the current frame that is supplied. In addition, the frame memory 21 supplies a picture of the preceding frame to a frame memory 22. The frame memory 22 stores a picture of one frame that is supplied. In addition, the frame memory 22 supplies a picture of the preceding frame to a frame memory 23. In such a manner, pictures of later frames are successively stored to the frame memories 21, 22, and 23.

In the following description, it is assumed that the frame memory 22 stores a picture of the current frame, the frame memory 21 stores a picture of the next frame of the current frame, and the frame memory 23 stores a picture of the preceding frame of the current frame.

It should be noted that the contents stored in the frame memories 21, 22, and 23 are not limited to the above-described example. Alternatively, pictures may be stored to the frame memories 21, 22, and 23 at intervals of two frames each. Further alternatively, five frame memories may be disposed so as to store pictures of five successive frames instead of the three successive frames. Further alternatively, field memories may be used instead of frame memories.

Picture data of the next frame, the current frame, and the preceding frame stored in the frame memories 21, 22, and 23 is supplied to a moving vector detecting portion 24, a moving vector detecting portion 25, a first area extracting portion 26, and a second area extracting portion 27, respectively.

The moving vector detecting portion 24 detects a moving vector between a considered pixel of a picture of the current frame stored in the frame memory 22 and a considered pixel of a picture of the preceding frame stored in the frame memory 23 at corresponding positions of the pictures. The moving vector detecting portion 25 detects a moving vector between a considered pixel of a picture of the current frame stored in the frame memory 22 and a considered pixel of the picture of the next frame stored in the frame memory 21 at corresponding positions of the pictures.

The moving vectors (moving directions and moving amounts) of the considered pixels detected by the moving vector detecting portions 24 and 25 are supplied to the first area extracting portion 26 and the second area extracting portion 27, respectively. As examples of the method for detecting the moving vectors, block matching method, estimating method using correlated coefficients, slope method, and so forth can be used.

While referencing the moving vectors detected by the moving vector detecting portions 24 and 25, the first area extracting portion 26 extracts pixels at predetermined positions (that will be described later) of the picture data of the individual frames and supplies the values of the extracted pixels to a feature detecting portion 28.

Corresponding to an output of the first area extracting portion 26, the feature detecting portion 28 generates class code that represents information of a noise component as will be described later and supplies the generated class code to a coefficient ROM 29. Since the pixels extracted by the first area extracting portion 26 are used to generate class code, these pixels are referred to as class taps.

The coefficient ROM 29 pre-stores predictive coefficients that are learnt (that will be described later) corresponding to individual classes (more practically, corresponding to addresses with respect to the class code). The coefficient ROM 29 receives as addresses the class code supplied from the feature detecting portion 28 and outputs corresponding predictive coefficients.

On the other hand, the second area extracting portion 27 extracts pixels to be predicted from picture data of three successive frames stored in the frame memories 21, 22, and 23 and supplies the values of the extracted pixels to an estimation calculating portion 30. The estimation calculating portion 30 performs a weighted calculation expressed by the following formula (1) corresponding to the output of the second area extracting portion 27 and the predictive coefficients that are read from the coefficient ROM 29 and generates a predicted picture signal from which noise has been eliminated. Since the pixel values extracted by the second area extracting portion 27 are used in weighted additions for generating the predictive picture signal, these pixel values are referred to as predictive taps.

$$y = w_1 \times x_1 + w_2 \times x_2 + \ldots + w_n \times x_n \qquad (1)$$

where $x_1, x_2, \ldots, x_n$ represent predictive taps; $w_1, W_2, \ldots, w_n$ represent predictive coefficients.

FIG. 7 shows tap structures of class taps and predictive taps extracted by the first area extracting portion 26 and the second area extracting portion 27, respectively. In FIG. 7, a considered pixel to be predicted is denoted by a black circle, whereas pixels extracted as class taps or predictive taps are denoted by shaded circles. FIG. 7A shows an example of the basic structure of class taps. From a current frame f[0] containing a considered pixel, a frame chronologically preceded by the current frame (namely, a preceding frame f[−1]), and a frame chronologically followed by the current frame (namely, a next frame f[+1]), pixels at positions spatially corresponding to the considered pixel are extracted as class taps.

In other words, in the tap structure of this example, as class taps, one pixel is extracted from the preceding frame f[−1], the current frame f[0], and the next frame [+1] each.

When the moving vectors of the considered pixels detected by the moving vector detecting portion 24 and the moving vector detecting portion 25 are remarkably small, the considered pixels are determined as still portions. In this case, pixels at corresponding positions of the preceding frame f[−1], the current frame f[0], and the next frame f[+1] are extracted as class taps used for detecting noise. Thus, the pixel positions of the class taps of the individual frames to be processed are constant. Thus, the tap structure does not vary.

On the other hand, when the motion of considered pixels is large to some extent and it is determined that the considered pixels are a moving portion, the first area extracting portion 26 extracts pixels at positions corresponding to the considered pixels from the preceding frame f[−1], the current frame f[0], and the next frame f[+1] as class taps. In other words, pixels at positions corresponding to the moving vector are extracted. The position of a pixel extracted from picture data of the next frame f[+1] is decided with a moving vector detected by the moving vector detecting portion 24. The position of a pixel extracted from picture data of the preceding frame f[−1] is decided with a moving vector detected by the moving vector detecting portion 25.

FIG. 7B shows an example of the basic structure of predictive taps extracted by the second area extracting portion 27. A total of 13 pixels including a considered pixel and for example 12 pixels adjacent thereto are extracted as predictive taps from picture data of a considered frame and picture data of frames that chronologically follow and precede the considered frame.

FIG. 7C and FIG. 7D show the case that the extracting positions are chronologically moved corresponding to moving vectors that are output from the moving vector detecting portions 24 and 25. As shown in FIG. 7E, when a moving vector of a considered frame is (0, 0), a moving vector of the preceding frame is (−1, −1), and a moving vector of the next frame is (1, 1), the extracting positions of class taps and predictive taps of all the frames are moved in parallel corresponding to the moving vectors.

As predictive taps, the same tap structure as class taps may be used.

As the result of extracted pixels corresponding to the moving vectors, class taps extracted by the first area extracting portion 26 are pixels at corresponding positions of pictures of a plurality of frames. Likewise, predictive taps extracted by the second area extracting portion 27 are pixels at corresponding positions of pictures of a plurality of frames since the motion of the pictures is compensated.

Alternatively, a tap structure of which the number of frame memories is five instead of three may be used. In this case, the frame memories store a current frame, two preceding frames, and two next frames. A considered pixel is extracted from only the current frame and pixels at corresponding positions of the considered pixel are extracted from the two preceding frames and the two next frames. In this case, since the pixel area from which pixels are extracted is chronologically extended, noise can be more effectively eliminated.

As will be described later, the feature detecting portion 28 detects the variation of the level of a noise component of a considered pixel corresponding to the variation of pixel values of pixels of three frames extracted as class taps. The feature detecting portion 28 outputs class code corresponding to the variation of the level of the noise component to the coefficient ROM 29. In other words, the feature detecting portion 28 categorizes the variation of the level of a noise component of a considered pixel as a class and outputs class code that represents the categorized class.

According to the embodiment, the feature detecting portion 28 performs ADRC (Adaptive Dynamic Range Coding) for an output of the first area extracting portion 26 and generates class code as the variation of the levels of pixels at corresponding position of a considered pixel of a plurality of frames.

Figure 8:
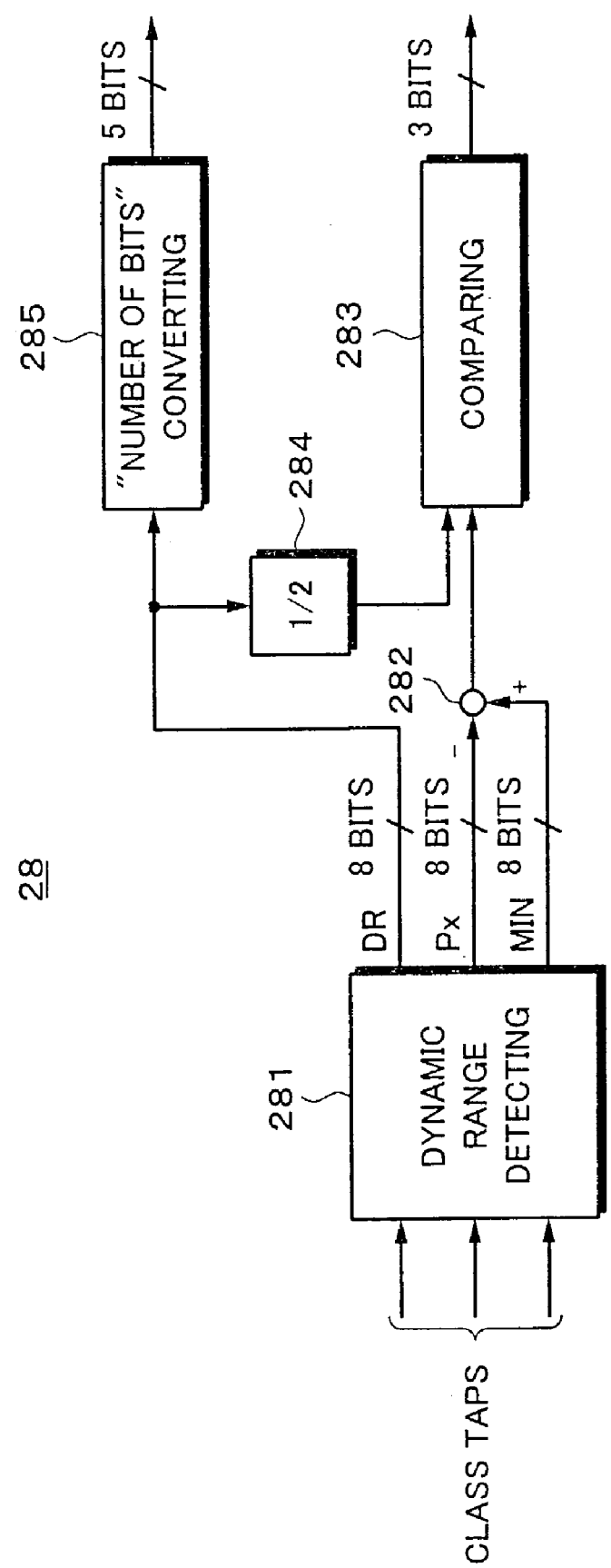
FIG. 8 is a block diagram showing an example of a feature detecting circuit that composes the class categorizing adaptive noise eliminating circuit.

FIG. 8 shows an example of the feature detecting portion 28. In FIG. 8, class code is generated by one-bit ADRC.

As was described above, a total of three pixels that are a considered pixel of the current frame, a pixel of the preceding frame, and a pixel of the next frame at corresponding positions of these frames are supplied from the frame memories 21, 22, and 23 to a dynamic range detecting circuit 281. The value of each pixel is represented by for example eight bits. The dynamic range detecting circuit 281 detects the maximum value MAX and the minimum value MIN of the three pixels, calculates MAX−MIN=DR, and obtains the dynamic range DR.

The dynamic range detecting circuit 281 outputs the calculated dynamic range DR, the minimum value MIN, and the pixel values Px of the three input pixels.

The pixel values Px of the three pixels are successively supplied from the dynamic range detecting circuit 281 to a subtracting circuit 282. The subtracting circuit 282 subtracts the minimum value MIN from each of the pixel values Px. As a result, normalized pixel values of which the minimum value MIN has been subtracted from each of the pixel values Px are supplied to a comparing circuit 283.

An output (DR/2) of a bit shifting circuit 284 that divides the dynamic range DR by 2 is supplied to the comparing circuit 283. The comparing circuit 283 detects the relation of each of the pixel values Px and DR/2. When each of the pixel values Px is larger than DR/2, the compared output of one bit of the comparing circuit 283 becomes "1". Otherwise, the compared output is "0". The comparing circuit 283 arranges the compared outputs of three bits in parallel and generates a three-bit ADRC output.

The dynamic range DR is supplied to a "number of bits" converting circuit 285. The "number of bits" converting circuit 285 converts eight bits of the dynamic range DR into for example three bits by quantization. The converted dynamic range and the three-bit ADRC output are supplied as class code to the coefficient ROM 29.

In the above-described class tap structure, the pixel values of the considered pixel of the current frame and the corresponding pixels of the preceding frame and the next frame do not vary. Alternatively, they tend to slightly vary. Thus, when they vary, it can be determined that they result from noise.

Figure 9:
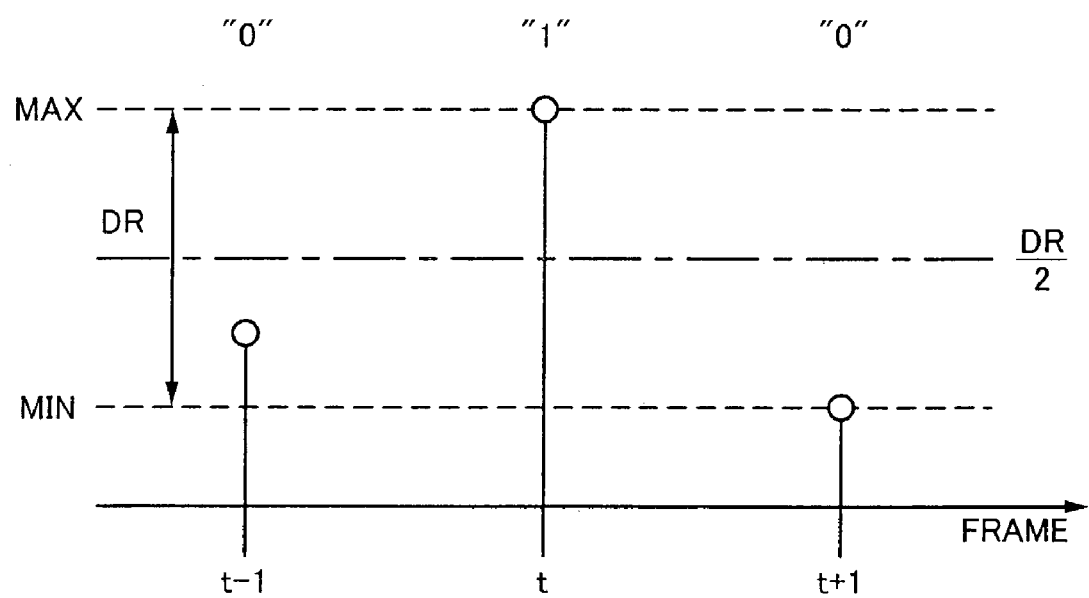
FIG. 9 is a schematic diagram for explaining an example of the feature extracting circuit.

For example, in the case shown in FIG. 9, when pixel values of class taps extracted from frames at t−1, t, and t+1 that are chronologically successive are processed by one-bit ADRC, an ADRC output of three bits [010] is generated. The dynamic range DR of which eight bits have been converted into five bits is output. The ADRC output of three bits represents the variation of the noise level of the considered pixel.

When multi-bit ADRC is performed instead of one-bit ADRC, the variation of the noise level can be more accurately represented. The noise level is represented by the dynamic range DR of which eight bits have been converted into five bits. By converting eight bits of the dynamic range DR into five bits, the number of classes can be prevented from being too large.

The class code generated by the feature detecting portion 28 contains code of for example three bits as for the variation of noise level in the chronological direction obtained as the result of ADRC and code of for example five bits as for the noise level as the result of the dynamic range DR. Since the dynamic range DR is used to categorize pixels as classes, a motion can be distinguished from noise. In addition, noise levels can be distinguished.

Figure 10:
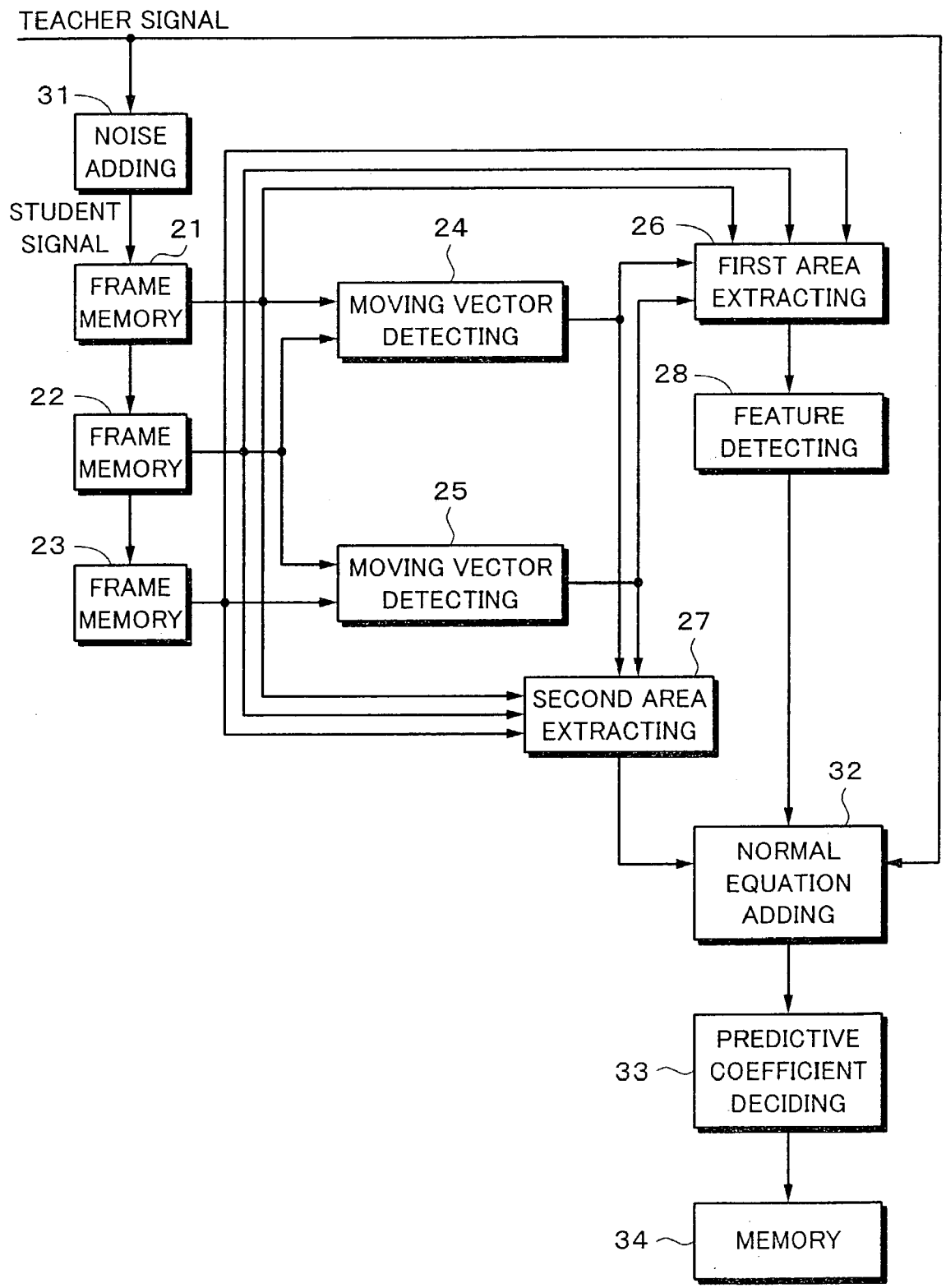
FIG. 10 is a block diagram showing the structure in which a learning is performed to generate coefficient data used in the class categorizing adaptive noise eliminating circuit.

Next, with reference to FIG. 10, a learning process of which predictive coefficients stored to the coefficient ROM 29 are obtained will be described. For simplicity, in FIG. 10, similar structural elements to those in FIG. 6 will be denoted by similar reference numerals.

An input picture signal that does not contain noise (this signal is referred to as teacher signal) is used for a learning and supplied to a noise adding portion 31 and a normal equation adding portion 32. The noise adding portion 31 adds a noise component to the input picture signal and generates a noise added picture (referred to as student signal). The generated student signal is supplied to a frame memory 21. As was described with reference to FIG. 6, pictures of student signals of three frames that are chronologically successive are stored to the frame memories 21, 22, and 23.

In the following description, it is assumed that the frame memory 22 stores a picture of the current frame, the frame memory 21 stores a picture of the next frame, and the frame memory 23 stores a picture of the preceding frame. As mentioned above, however, it should be noted that the contents stored in the frame memories 21, 22, and 23 are not limited to such pictures.

On the next stages of the frame memories 21, 22, and 23, almost the same processes as those described with reference to FIG. 6 are performed. In FIG. 10, similar blocks to those in FIG. 6 will be denoted by similar reference numerals. The class code generated by a feature detecting portion 28 and predictive taps extracted by a second area extracting portion 27 are supplied to a normal equation adding portion 32. In addition, a teacher signal is supplied to the normal equation adding portion 32. To generate coefficients corresponding to the three types of inputs, the normal equation adding portion 32 performs a process for generating a normal equation. A predictive coefficient deciding portion 33 decides predictive coefficients for each class code using the normal equation. The predictive coefficient deciding portion 33 supplies the decided predictive coefficients to a memory 34. The memory 34 stores the supplied predictive coefficients corresponding to the individual classes. The predictive coefficients stored in the memory 34 are the same as the predictive coefficients stored in the coefficient ROM 29 (see FIG. 6).

Next, a normal equation will be described. In the formula (1), before predictive coefficients $w_1, \ldots,$ and $w_n$ are learnt, they are indeterminate coefficients. The predictive coefficients are learnt by inputting a plurality of teacher signals corresponding to individual classes. When the number of types of teacher signals per class is denoted by m, the formula (2) can be obtained from the formula (1).

$$y_k = w_1 \times x_{k1} + w_2 \times x_{k2} + \ldots + w_n \times x_{kn} \tag{2}$$

(where k=1, 2, . . . , m)

When m>n, since the predictive coefficients $w_1, \ldots,$ and $w_n$ are not uniquely designated, elements $e_k$ of an error vector e are defined by the following formula (3).

$$e_k = y_k \{w_1 \times w_{k1} + w_2 \times x_{k2} + \ldots + w_n \times x_{kn}\} \tag{3}$$

(where k=1, 2, . . . , m)

The predictive coefficients are designated in such a manner that the error vector e defined by the following formula (4) becomes minimum. In other words, the predictive coefficients are uniquely designated using so-called method of least squares.

$$e^2 = \sum_{k=0}^{m} e_k^2 \qquad (4)$$

As a practical calculating method for obtaining the predictive coefficients of which $e^2$ of the formula (4) becomes minimum, each predictive coefficient $w_i$ is obtained by partially differentiating $e^2$ with respect to the predictive coefficients $w_i$ (where i=1, 2, . . . ) (formula (5)) so that the partially differentiated value of each value of i becomes 0.

$$\frac{\partial e^2}{\partial w_i} = \sum_{k=0}^{m} 2\left(\frac{\partial e_k}{\partial w_i}\right) e_k = \sum_{k=0}^{m} 2 x_{ki} \cdot e_k \qquad (5)$$

Next, a practical process for designating each predictive coefficient $w_i$ using the formula (5) will be described. When $X_{ji}$ and $Y_i$ are defined as the following formulas (6) and (7), respectively, the formula (5) can be expressed as the following formula (8) in a matrix form.

$$X_{ji} = \sum_{p=0}^{m} x_{pi} \cdot x_{pj} \qquad (6)$$

$$Y_i = \sum_{k=0}^{m} x_{ki} \cdot y_k \qquad (7)$$

$$\begin{bmatrix} x_{11} & x_{12} & \cdots & x_{1n} \\ x_{21} & x_{22} & \cdots & x_{2n} \\ \cdots & \cdots & \cdots & \cdots \\ x_{n1} & x_{n2} & \cdots & x_{nn} \end{bmatrix} \begin{bmatrix} W_1 \\ W_2 \\ \cdots \\ W_n \end{bmatrix} \begin{bmatrix} Y_1 \\ Y_2 \\ \cdots \\ Y_n \end{bmatrix} \qquad (8)$$

The formula (8) is generally referred to as normal equation. The predictive coefficient deciding portion 33 calculates each parameter of the normal equation (8) corresponding to the above-mentioned three types of inputs. In addition, the predictive coefficient deciding portion 33 calculate the predictive coefficients $w_i$ by a calculating process for solving the normal equation (8) by using a conventional matrix solving method such as sweep-out method.

When the noise adding portion 31 adds noise, one of the following four methods can be used.

1. As with a computer simulation, random noise is generated and added to an input picture signal.

2. Noise is added to an input picture signal through an RF system.

3. A noise component is extracted as the difference between a plain picture signal that does not largely vary and a signal of which the picture signal has been processed through an RF system. The extracted noise component is added to the input picture signal.

4. A noise component is extracted as the difference between a signal of which a plain picture signal has been processed through an RF system and a picture signal component of which noise has been eliminated by adding such a signal to a plurality of frames. The extracted noise component is added to an input picture signal.

When the noise eliminating circuit 12 using the above-mentioned class categorizing adaptive process performs the class categorizing adaptive process for eliminating noise from a picture signal, the noise eliminating circuit 12 extracts a considered pixel and pixels at corresponding positions thereof as class taps, detects the variation of the noise level among frames corresponding to the data of the class taps, and generates class code corresponding to the detected variation of the noise level.

Thereafter, a motion among the frames is estimated. Pixels to be used in the noise component detecting process (these pixels are referred to as class taps) and pixels to be used in the predictive calculating process (these pixels are referred to as predictive taps) are extracted so that the estimated motion is compensated. Corresponding to each class of which a noise component has been reflected, by a linear combination of predictive taps and predictive coefficients, a picture signal from which noise has been eliminated is calculated.

Thus, predictive coefficients that accurately correspond to the variation of the noise component among frames can be selected. Thus, using such predictive coefficients, a predictive calculation is performed. As a result, the noise component can be adequately eliminated.

In addition, even if a picture moves among frames, the noise level can be correctly detected. Thus, the noise can be eliminated. In particular, a picture can be prevented from becoming unsharp against a mistaken determination of a motion adaptive type recursive filter that mistakenly determines that a moving portion is a still portion as was described with reference to FIG. 1.

In a class tap structure of which class taps do not spatially spread in a frame (namely, a tap structure of which only a considered pixel is extracted from the current frame and a pixel at a corresponding position of the considered pixel is extracted from a frame chronologically followed/preceded by the current frame is used as class taps and/or predictive taps), a factor that causes a picture signal in the spatial direction to become unsharp can be suppressed from adversely affecting the process. In other words, the situation of which for example an edge causes an output picture signal to become unsharp can be suppressed.

As was described above, the class categorizing adaptive noise eliminating circuit 12 eliminates noise regardless of whether a picture is still or moving. However, when a picture is a perfect still portion, the class categorizing adaptive noise eliminating circuit 12 is inferior to the motion adaptive type recursive filter that can store information of a long frame.

As was described above, according to the present invention, when a picture is a still portion, an output of the motion adaptive type recursive filter shown in FIG. 1 or FIG. 4 is selected and output. In contrast, when a picture is a moving portion, an output of the class categorizing adaptive noise eliminating circuit is selected and output. Thus, regardless of whether a picture is a moving portion or a still portion, an output picture signal from which noise has been adequately eliminated can be obtained.

It should be noted that class taps and predictive taps of the first area extracting portion 26 and the second area extracting portion 27 in the description of the class categorizing adaptive eliminating circuit are only examples. In other words, the present invention is not limited to such class taps and predictive taps.

In the above description, the feature detecting portion 28 uses a one-bit ADRC encode circuit. Alternatively, as was mentioned above, the feature detecting portion 28 may use a multi-bit ADRC encode circuit. Further alternatively, the feature detecting portion 28 may use a non-ADRC encode circuit.

In the above description, an output of the motion adaptive type recursive filter 11 or an output of the class categorizing adaptive noise eliminating circuit 12 is selected pixel by pixel. Alternatively, instead of each pixel, such an output may be selected for each pixel block (composed of a predetermined number of pixels), each object, or each frame. In this case, the still portion—moving portion determining circuit determines whether each pixel block, each object, or each frame is a still portion or a moving portion.

In the above-described example, an alternative section of which an output of one motion adaptive type recursive filter or an output of one class categorizing adaptive eliminating circuit is selected was used. Alternatively, a plurality of motion adaptive type recursive filters and/or a plurality of noise eliminating circuits using the class categorizing adaptive process may be disposed and one output picture signal may be selected therefrom.

Figure 11:
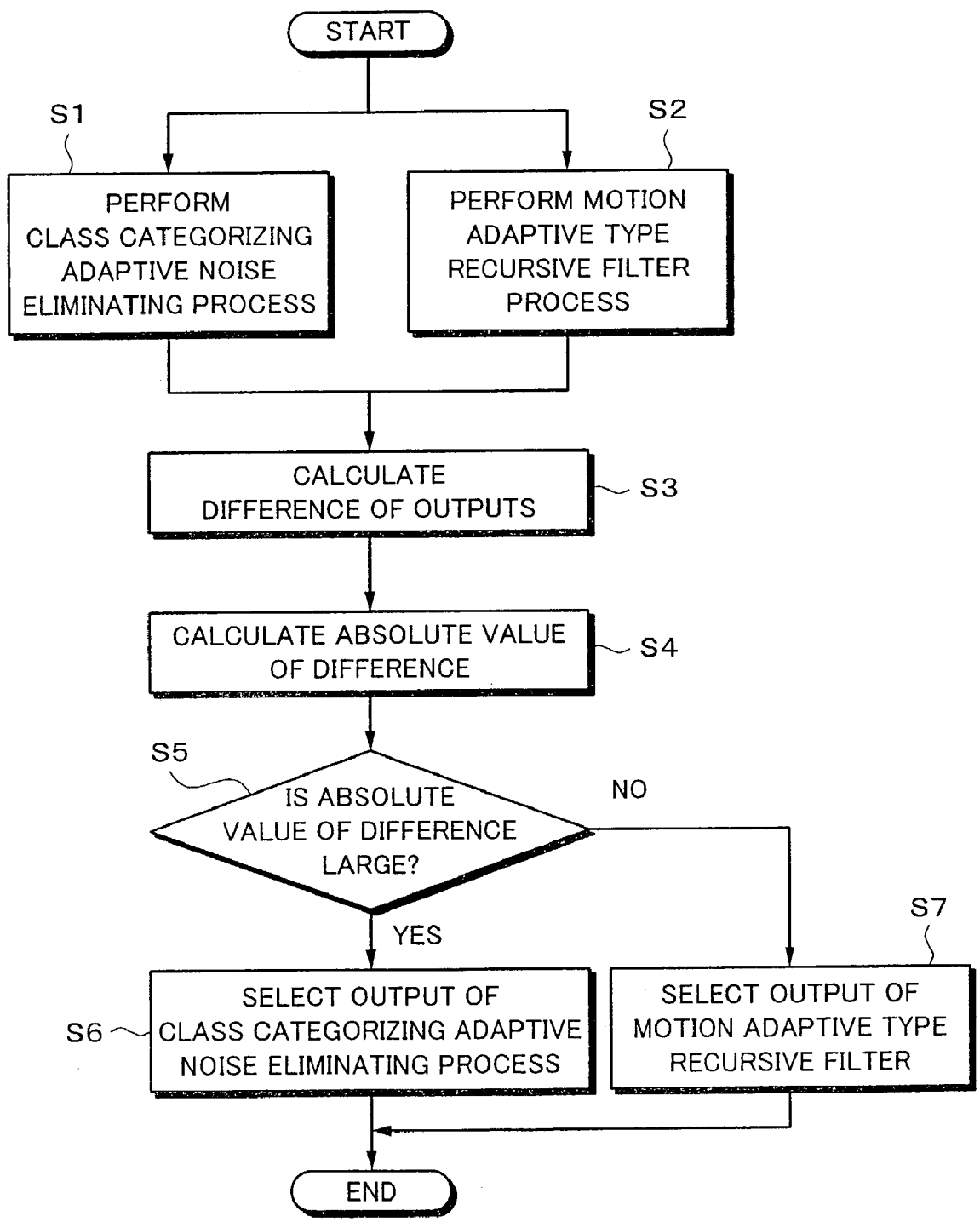
FIG. 11 is a flow chart for explaining a process of which the embodiment of the present invention is processed by software.

The embodiment of the present invention can be accomplished by software as well as hardware. Next, a process of the embodiment of the present invention accomplished by software will be explained. FIG. 11 is a flow chart showing a noise eliminating process according to the embodiment of the present invention. As shown at steps S1 and S2, a class categorizing adaptive noise eliminating process and a motion adaptive type recursive filter process are performed in parallel. The difference between the results obtained in these processes is calculated (at step S3).

At step S4, the absolute value of the difference is calculated. At step S5, it is determined whether or not the absolute value of the difference is large. When the determined result represents that the absolute value of the difference is large, an output of the class categorizing adaptive noise eliminating process is selected (at step S6). Otherwise, an output of the motion adaptive type recursive filter is selected (at step S7). As a result, the noise eliminating process for one pixel is completed.

Figure 12:
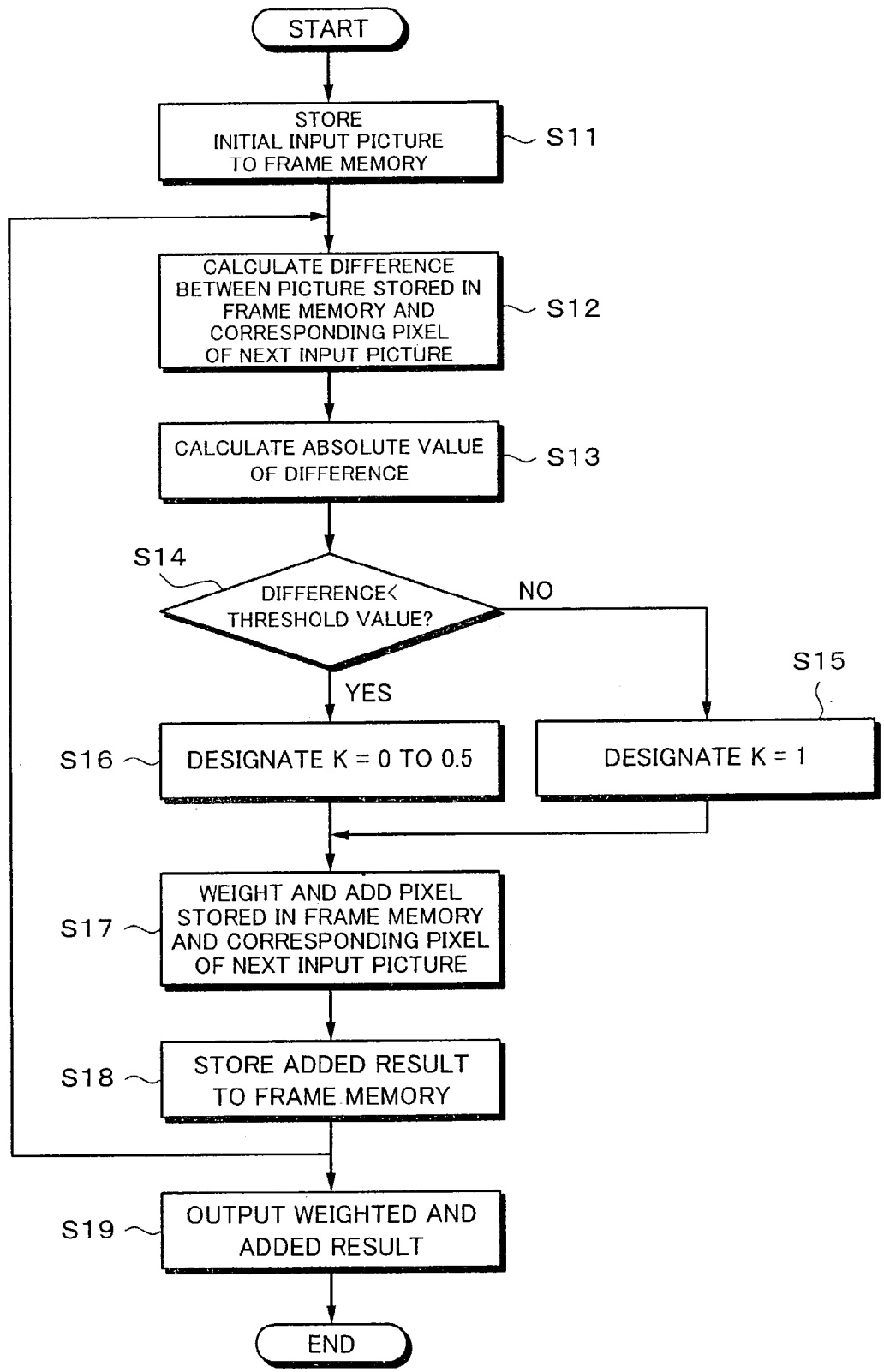
FIG. 12 is a flow chart showing a process of a motion adaptive type recursive filter.

FIG. 12 is a flow chart showing the detail of the motion adaptive type recursive filter process at step S2. At step S11, an initial input picture is stored to a frame memory. At step S12, the difference (frame difference) of the picture stored in the frame memory and the next input picture is calculated. At step S13, the absolute value of the difference is calculated.

At step S14, the absolute value of the difference is compared with a predetermined threshold value. When the absolute value of the difference is equal to or larger than the threshold value, a weighting coefficient k by which the input picture signal is designated to 1 (at step S15). In other words, since the input picture signal is a moving portion, a weighting coefficient (1−k) by which the output signal of the frame memory is multiplied is designated to 0. In contrast, when the absolute value of the difference is smaller than the threshold value, at step S16, k is designated to a value in the range of (0 to 0.5).

Thereafter, a pixel stored in the frame memory and a pixel at a corresponding position of the next input picture are weighted and added (at step S17). The added result is stored to the frame memory (at step S18). Thereafter, the flow returns to step S12. Thereafter, the added result is output (at step S19).

Figure 13:
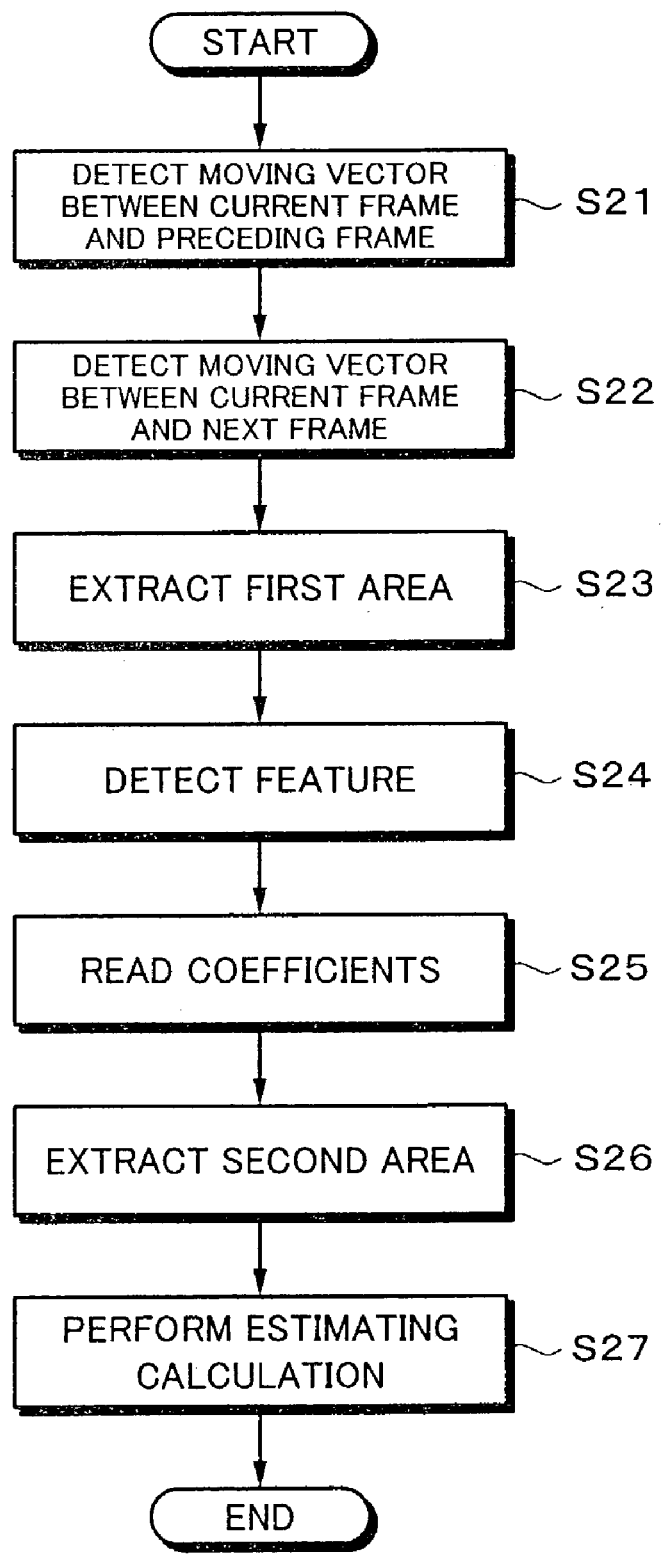
FIG. 13 is a flow chart showing a noise eliminating process of the class categorizing adaptive process.

FIG. 13 is a flow chart showing the detail of the class categorizing adaptive noise eliminating process at step S1. First of all, at step S21, a moving vector between the current frame and the preceding frame is detected. At step S22, a moving vector between the current frame and the next frame is detected. At step S23, a first area is extracted. In other words, class taps are extracted. At step S24, a feature detecting process is performed for the extracted class taps. Coefficients corresponding to a detected feature are read from coefficients that have been obtained by a learning process (at step S25).

At step S26, a second area (predictive taps) is extracted. At step S27, an estimating calculation is performed using the coefficients and predictive taps. As a result, an output from which noise has been eliminated is obtained. In the first area extracting process (at step S23) and the second area extracting process (at step S26), the extracting positions are changed corresponding to the moving vectors detected at steps S21 and S22, respectively.

Figure 14:
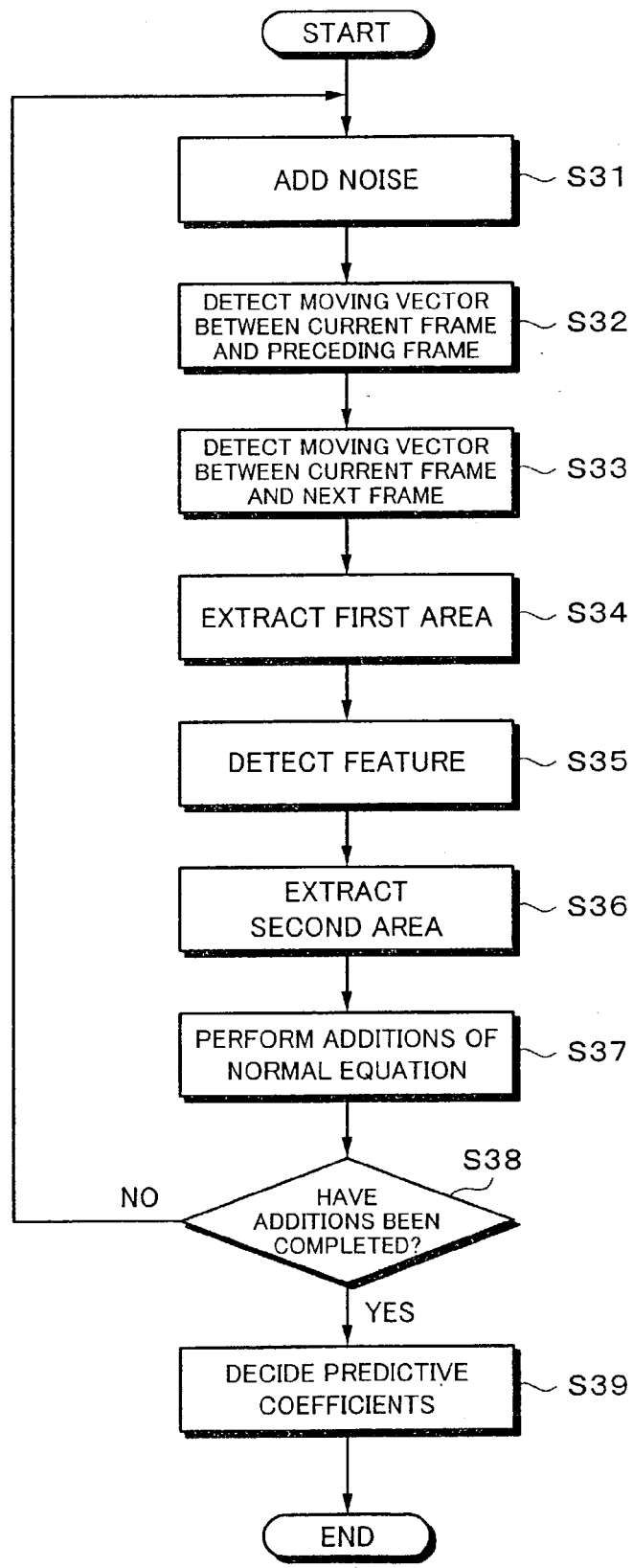
FIG. 14 is a flow chart showing a process in which a learning is performed to generate coefficient data used in the class categorizing adaptive noise eliminating circuit.

FIG. 14 is a flow chart showing a learning process for obtaining coefficients used in the class categorizing adaptive noise eliminating process. At step S31, noise is added to a picture signal that does not contain noise (this signal is referred to as teacher signal). As a result, a student signal is generated. At step S32, with respect to the student signal, a moving vector between the current frame and the preceding frame is detected. At step S33, a moving vector between the current frame and the next frame is detected. Area extracting positions are changed corresponding to the detected moving vectors.

At step S34, a first area (class taps) is extracted. A feature is detected corresponding to the extracted class taps (at step S35). At step S36, a second area (predictive taps) is extracted. At step S37, data necessary for solving a normal equation with which predictive coefficients are solved is calculated with the teacher picture signal, data of the predictive taps, and the detected feature.

At step S38, it is determined whether or not additions of the normal equation have been completed. When the additions have not been completed, the flow returns to step S31. When the determined result represents that the process has been completed, at step S39, predictive coefficients are decided. The obtained predictive coefficients are stored in a memory. The predictive coefficients stored in the memory are used for the noise eliminating process.

As was described above, with the noise eliminating circuit according to the present invention, when a picture is a still portion, an output of the noise eliminating circuit that has a large noise eliminating effect for a still portion such as a motion adaptive type recursive filter is selected. When a picture is a moving portion, an output of a noise eliminating circuit such as a class categorizing adaptive noise eliminating circuit that can eliminate noise of a moving portion is selected. Thus, regardless of whether a picture is a moving portion or a still portion, a picture signal output from which noise has been adequately eliminated can be obtained.

Next, with reference to drawings from FIG. 15, a resolution converting apparatus that performs an upconvert will be described as another embodiment of the present invention. According to the other embodiment, an above-mentioned standard television format (hereinafter referred to as SD) picture signal as an input picture signal is converted into an output picture signal in a high vision format (hereinafter referred to as HD). According to the other embodiment, as shown in FIG. 16, for each considered pixel of an SD picture, four pixels of an HD picture are generated so as to convert the resolution of the input picture signal.

Figure 15:
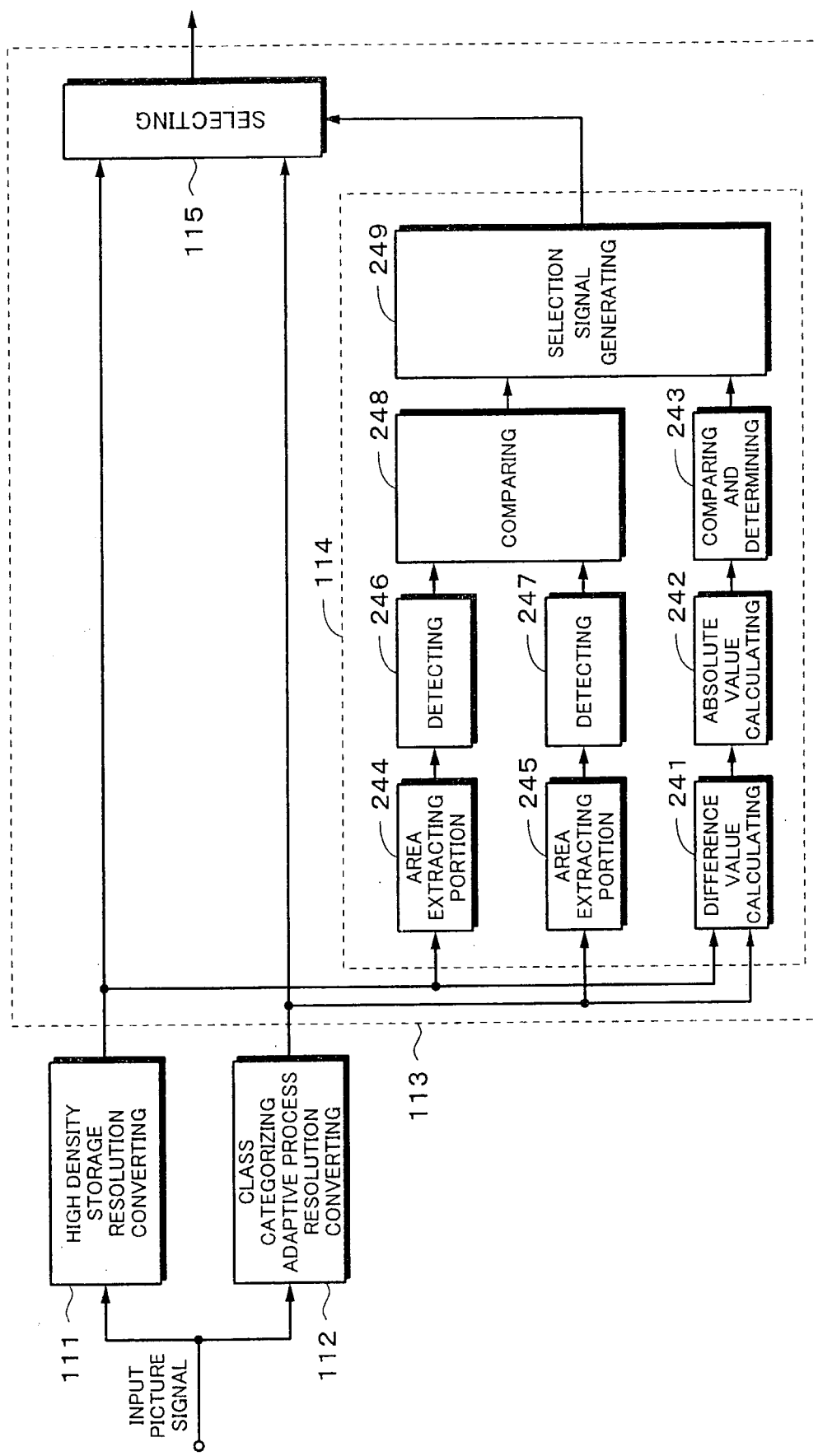
FIG. 15 is a block diagram showing another embodiment of the present invention.
Figure 16:
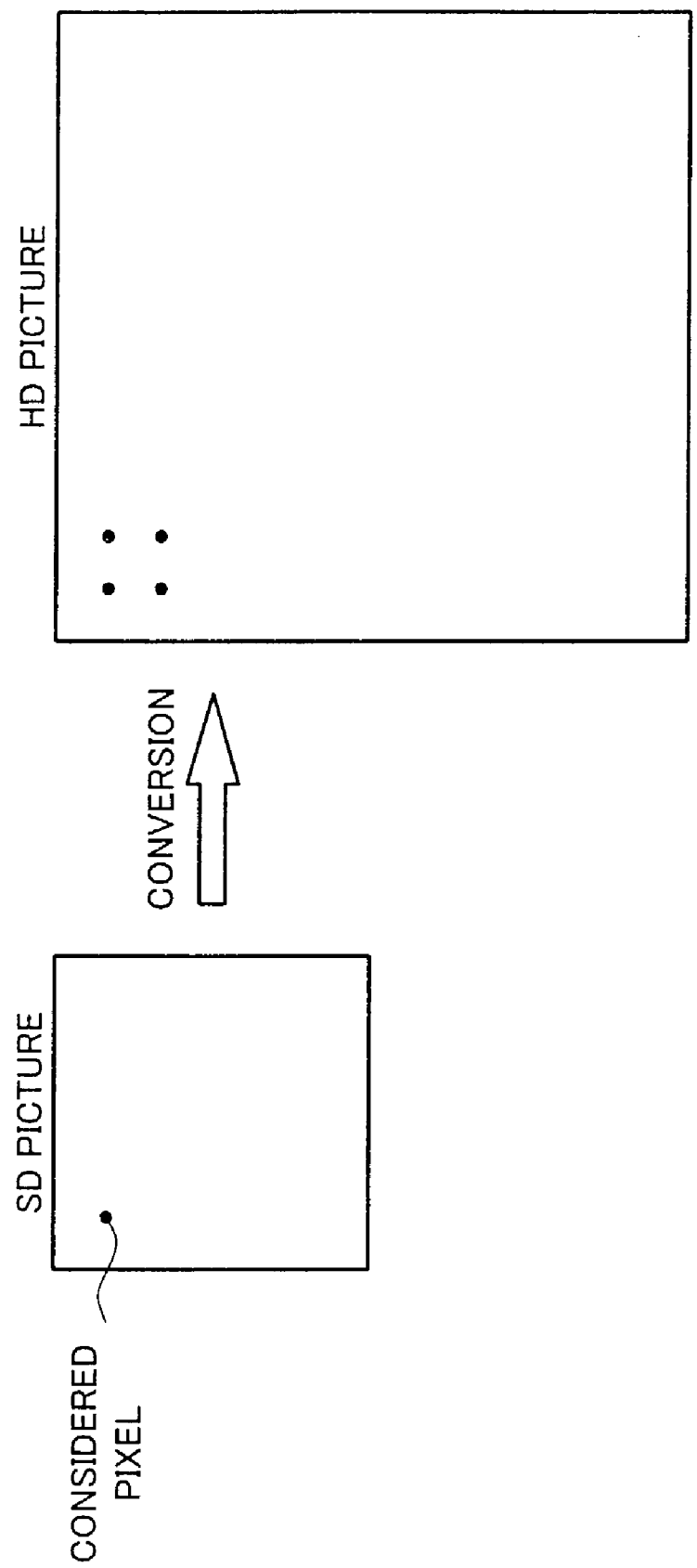
FIG. 16 is a schematic diagram for explaining a resolution converting process according to the other embodiment.

FIG. 15 is a block diagram showing the structure of the other embodiment. As shown in FIG. 15, an input picture signal is supplied pixel by pixel to a high density storage resolution converting circuit 111 that composes an example of the resolution converting portion using the storage type process. In addition, the input picture signal is supplied to a class categorizing adaptive process resolution converting circuit 112 that composes an example of the resolution converting portion using the class categorizing adaptive process.

The high density storage resolution converting circuit 111 has a frame memory that stores a picture signal of an HD equivalent picture. The high density storage resolution converting circuit 111 references a motion between a picture of a picture signal stored in the frame memory and a picture of an SD input picture signal, compensates the pixel positions, and stores the SD input picture signal to the frame memory so as to generate an output picture signal of an HD equivalent picture in the frame memory. The detailed structure of the high density storage resolution converting circuit 111 will be described later. The converted picture signal of the HD equivalent picture generated by the high density storage resolution converting circuit 111 is supplied to an output selecting portion 113.

In contrast, the class categorizing adaptive process resolution converting circuit 112 detects a feature of a considered pixel of a picture of an SD input picture signal from a plurality of pixels including the considered pixel and pixels chronologically and spatially adjacent thereto. The class categorizing adaptive process resolution converting circuit 112 categorizes the considered pixel as a class corresponding to the detected feature and generates a plurality of pixels of an HD picture corresponding to the considered pixel by a predetermined picture conversion calculating process corresponding to the categorized class so as to generate a high resolution output picture signal. The detailed structure of the class categorizing adaptive process resolution converting circuit 112 will be described later. The converted picture signal of the HD equivalent picture generated by the class categorizing adaptive process resolution converting circuit 112 is supplied to an output selecting portion 113.

The output selecting portion 113 is composed of a determining circuit 114 and a selecting circuit 115 that will be described later. The converted picture signal supplied from the high density storage resolution converting circuit 111 and the converted picture signal supplied from the class categorizing adaptive process resolution converting circuit 112 are supplied to the selecting circuit 115.

The converted picture signal supplied from the high density storage resolution converting circuit 111 and the converted picture signal supplied from the class categorizing adaptive process resolution converting circuit 112 are supplied to the determining circuit 114. The determining circuit 114 determines a motion and an activity of each of the two converted picture signals in the unit of a predetermined number of pixels. The determining circuit 114 generates a selection control signal that causes one of the converted picture signal supplied from the high density storage resolution converting circuit 111 and the converted picture signal supplied from the class categorizing adaptive process resolution converting circuit 112 to be selected in the unit of a predetermined number of pixels. In the example, the determining circuit 114 determines which of the two converted picture signals is selected for each pixel and supplies the determined result as a selection control signal to the selecting circuit 115.

[Example of Structure of High Density Storage Resolution Converting Circuit]

Figure 17:
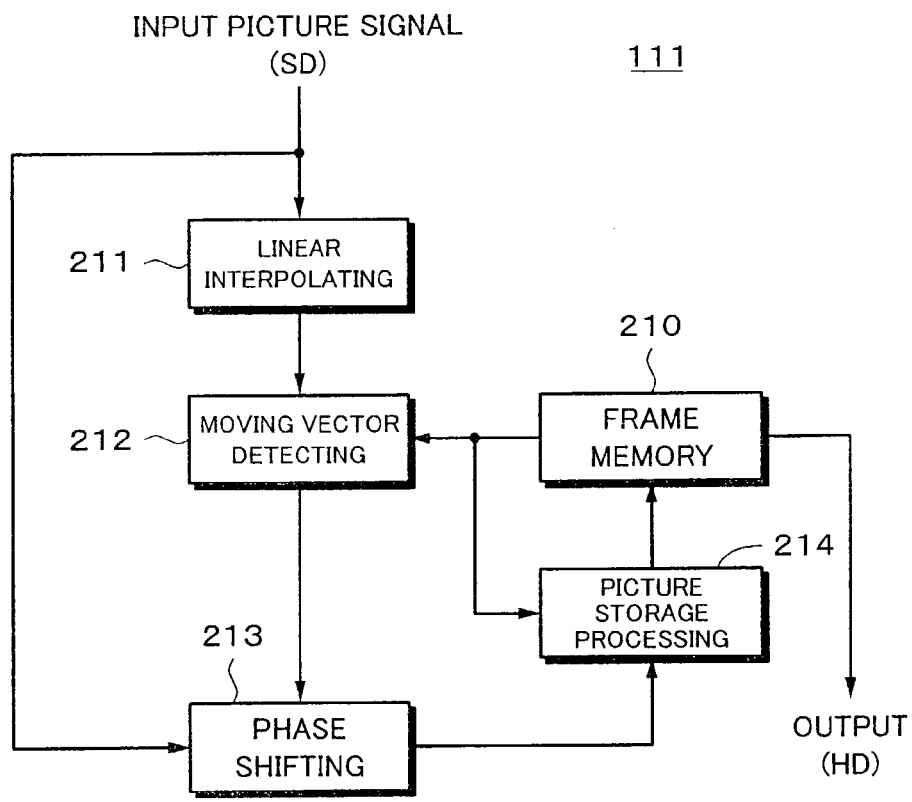
FIG. 17 is a block diagram showing the structure of an example of a resolution converting portion using the storage type process according to the other embodiment.

FIG. 17 shows an example of the structure of the high density storage resolution converting circuit 111 according to the other embodiment. The high density storage resolution converting circuit 111 is effective for converting the resolution of a picture into another resolution when the picture is a still picture or a moving picture that has a simple motion such as a pan or a tilt except for a scene change or a zoom.

As shown in FIG. 17, the high density storage resolution converting circuit 111 has a frame memory 210. The frame memory 210 stores each pixel value of a picture signal of one frame having a resolution of an HD equivalent picture (see FIG. 16).

First of all, an SD input picture signal is supplied to a linear interpolating portion 211. The linear interpolating portion 211 performs a linear interpolation for the SD input picture signal so as to generate a picture signal having pixels equivalent to an HD picture with the SD input picture signal and outputs the generated picture signal to a moving vector detecting portion 212. When a moving vector between the SD input picture and the HD equivalent picture stored in the frame memory 210 is detected, the linear interpolating portion 211 performs the process in such a manner that the size of the SD input picture is matched with the size of the HD equivalent picture.

The moving vector detecting portion 212 detects a moving vector between an output picture of the linear interpolating portion 211 and the HD equivalent picture stored in the frame memory 210. The moving vector is detected by matching representative points on full screens. In this case, the accuracy of the detected moving vector of the HD equivalent picture is one pixel. Thus, the accuracy of the detected moving vector of the SD input picture signal is less than one pixel.

The moving vector detected by the moving vector detecting portion 212 is supplied to a phase shifting portion 213. Corresponding to the supplied moving vector, the phase shifting portion 213 shifts the phase of the SD input picture signal. The phase shifting portion 213 supplies the resultant SD input picture signal to a picture storage processing portion 214. The picture storage processing portion 214 performs a storing process for the picture signal stored in the frame memory 210 and the SD input picture signal that has been phase-shifted by the phase shifting portion 213. The stored contents of the frame memory 210 are rewritten with the picture signal for which the storing process has been performed.

FIGS. 18 and 19 are schematic diagrams showing the concept of the process performed by the picture storage processing portion 214. For simplicity, FIGS. 18 and 19 show a storage process in only the vertical direction. However, in addition, the storage process is performed in the horizontal direction.

Figure 18A:
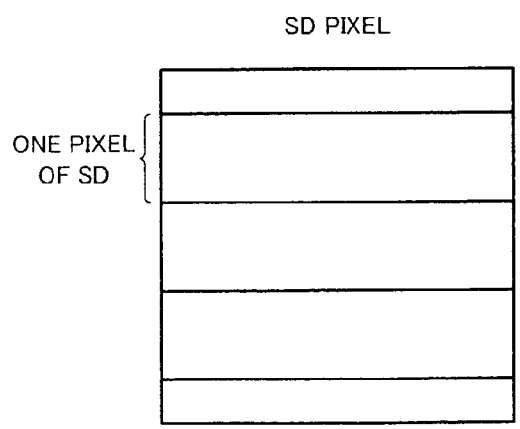
FIG. 18 is a schematic diagram for explaining a converting process of the resolution converting portion using the storage type process.

FIGS. 18A and 19A show an SD input picture signal. In FIG. 19, black circles represent real pixels of an SD picture, whereas white circles represent pixels that do not exist. In the example shown in FIG. 19, since the moving vector detecting portion 212 has detected a motion for three pixels in the vertical direction of an HD equivalent picture, the phase shifting portion 213 shifts the phases of three pixels in the vertical direction of an SD input picture signal. As mentioned above, since the accuracy of the detected moving vector is one pixel of an HD equivalent picture, as shown in FIG. 19B, the positions of the pixels of the SD input picture signal whose phases have been shifted correspond to the positions of pixels of the picture signal of the HD equivalent picture stored in the frame memory 210.

In the picture storage process, each pixel whose phase has been shifted and each corresponding pixel of the HD equivalent picture signal (see FIG. 18B and FIG. 19C) stored in the frame memory 210 are added and then the average value thereof is obtained. Thereafter, with each added output pixel, each corresponding pixel stored in the frame memory 210 is rewritten. In other words, when an SD picture has a motion, it is compensated. Each pixel of the HD storage picture and each corresponding pixel of the SD input picture are added. In this case, the HD storage picture and the SD input picture to be added may be weighted.

Figure 18B:
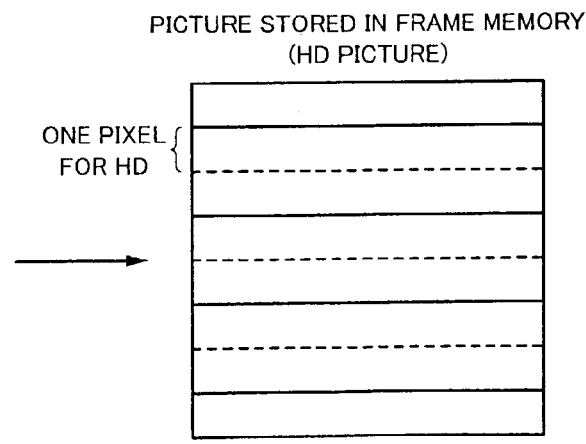

By the picture storage process, the original SD picture is shifted corresponding to a moving vector with an accuracy of one pixel of the HD picture and then stored in the frame memory 210. Thus, corresponding to the SD picture shown in FIG. 19A, the HD equivalent picture shown in FIG. 18B or FIG. 19C is stored in the frame memory 210. FIG. 18 and FIG. 19 are schematic diagrams for explaining the picture storage process in only the vertical direction. However, the SD picture is also converted into the HD equivalent picture in the horizontal direction as well as the vertical direction.

The picture signal stored as an HD output picture signal in the frame memory 210 by the above-described storage process is supplied to the output selecting portion 113 as an output of the high density storage resolution converting circuit 111. Since the HD output picture signal that is output from the high density storage resolution converting circuit 111 is generated by the above-mentioned high density storage process for the picture in the chronological direction, when the SD input picture is a still picture portion or a moving picture portion moving picture that has a simple motion such as a pan or a tilt except for a scene change or a zoom, an HD output picture that less deteriorates and that does not have a folded distortion can be obtained.

However, when the SD input picture is a moving picture portion that has a large moving portion such as a scene change or a zoom, a class categorizing adaptive process resolution converting circuit that performs an SD-HD conversion in the unit of a predetermined number of pixels that is more than one pixel can output an HD output picture with high quality as will be described later.

[Example of Structure of Class Categorizing Adaptive Process Resolution Converting Circuit]

Next, the class categorizing adaptive process resolution converting circuit 112 according to the other embodiment will be described in detail. In the following example, in the class categorizing adaptive process, a considered pixel of an SD input picture signal is categorized as a class corresponding to a feature thereof. Predictive coefficients that have been learnt for individual classes are stored in a memory. By a calculating process corresponding to weighted additions using the predictive coefficients, optimally estimated pixel values of a plurality of HD pixels corresponding to the considered pixel are output.

FIG. 20 shows an example of the overall structure of the class categorizing adaptive process resolution converting circuit 112 according to the other embodiment.

An SD input picture signal to be processed is supplied to a field memory 221. The field memory 221 always stores an SD picture signal of the preceding field. The SD input picture signal and the SD picture signal of the preceding field stored in the field memory 221 are supplied to a first area extracting portion 222 and a second area extracting portion 223.

The first area extracting portion 222 performs a process for considering a plurality of pixels from the SD input picture signal and the SD picture signal so as to extract a feature of a considered pixel of the SD input picture signal (as will be described later, these pixels are referred to as class taps).

The first area extracting portion 222 supplies the pixel values of the extracted pixels to a feature detecting portion 224. The feature detecting portion 224 generates class code that represents the feature of the considered pixel using the considered pixel of the first area and pixels chronologically and spatially adjacent thereto. The feature detecting portion 224 supplies the generated class code to a coefficient ROM 225. Since the plurality of pixels extracted by the first area extracting portion 222 are used to generate the class code, they are referred to as class taps.

The coefficient ROM 225 pre-stores predictive coefficients for individual classes that are leant as will be described later (in reality, at addresses corresponding to class code). The coefficient ROM 225 receives the class code as an address from the feature detecting portion 224 and outputs corresponding predictive coefficients.

On the other hand, the second area extracting portion 223 extracts a plurality of predictive pixels including a considered pixel in a predictive pixel area (second area) from the SD input picture signal and the SD picture signal of the preceding frame stored in the field memory 221 and supplies the values of the extracted pixels to an estimation calculating portion 226.

The estimation calculating portion 226 performs a calculation expressed by the following formula (11) with the pixel values of the plurality of predictive pixels extracted by the second area extracting portion 223 and the predictive coefficients that are read from the coefficient ROM 225, obtains the pixel values of the plurality of pixels of the HD picture corresponding to the considered pixel of the SD picture, and generates a predictive HD picture signal. Thus, since the pixel values extracted by the second area extracting portion 223 are used for weighted additions to generate the predictive HD picture signal, these pixel values are referred to as predictive taps. The formula (11) is the same as the formula (1) according to the above-described embodiment.

$$y = w_1 \times x_1 + w_2 \times x_2 + \ldots + w_n \times x_n \tag{11}$$

where $x_1, x_2, \ldots,$ and $x_n$ represent predictive taps; and $w_1, w_2, \ldots,$ and $w_n$ represent predictive coefficients.

Next, with reference to FIG. 21, an example of class taps extracted by the first area extracting portion 222 will be described. In the example, a plurality of pixels are extracted as class taps as shown in FIG. 21. FIG. 21 shows a field that contains a considered pixel and a field preceded thereby.

In FIG. 21, black circles represent pixels of an n-th field (for example, an odd field), whereas white circles represent pixels of an (n+1)-th field (for example, an even field). Class taps are composed of a considered pixel and a plurality of pixels chronologically and spatially adjacent thereto.

When a considered pixel is a pixel of the n-th field, class taps are structured as shown in FIG. 21A. From the n-th field, a considered pixel, a pixel at an upper position of the considered pixel, a pixel at a lower position of the considered pixel, two pixels on the left positions of the considered pixel, and two pixels on the right positions of the considered pixel are extracted as class taps. From the preceding field, six pixels spatially adjacent to the considered pixel are extracted as class taps. Thus, a total of 13 pixels are extracted as class taps.

In contrast, when the considered pixel is a pixel of the (n+1)-th field, class taps are structured as shown in FIG. 21B. From the (n+1)-th field, a considered pixel, a pixel on the left of the considered pixel, and a pixel on the right of the considered pixel are extracted as class taps. From the preceding field, six pixels spatially adjacent to the considered pixel are extracted as class taps. Thus, a total of nine pixels are extracted as class taps. In this example, predictive taps extracted by the second area extracting portion 27 are structured as with the above-described class taps.

Next, an example of the structure of the feature detecting portion 224 will be described. According to the other embodiment, a pattern of a plurality of pixel values extracted as class taps by the first area extracting portion 222 is used as a feature of a considered pixel. Although there are a plurality of patterns corresponding to class taps, each pattern of pixel values is treated as one class.

The feature detecting portion 224 categorizes a feature of a considered pixel as a class using a plurality of pixel values extracted as class taps by the first area extracting portion 222 and outputs class code that represents the categorized class corresponding to the class taps.

According to the other embodiment, the feature detecting portion 224 performs ADRC (Adaptive Dynamic Range Coding) for the output of the first area extracting portion 222 and generates the ADRC output as class code that represents a feature of a considered pixel.

FIG. 22 shows an example of the feature detecting portion 224. FIG. 22 generates class code by one-bit ADRC.

As mentioned above, 13 or 9 pixels as class taps are supplied from the first area extracting portion 222 to a dynamic range detecting circuit 121. The value of each pixel is represented by for example eight bits. The dynamic range detecting circuit 121 detects the maximum value MAX and the minimum value MIN of the plurality of pixels as the class taps, calculates MAX−MIN=DR, and obtains the dynamic range DR.

The dynamic range detecting circuit 121 outputs the calculated dynamic range DR, the minimum value MIN, and pixel values Px of the plurality of pixels that are input.

The pixel values Px of the plurality of pixels are successively supplied from the dynamic range detecting circuit 121 to a subtracting circuit 22. The subtracting circuit 22 subtracts the minimum value MIN from each pixel value Px. Since the minimum value MIN is subtracted from each pixel value Px, a normalized pixel value is supplied to a comparing circuit 123.

Figure 23:
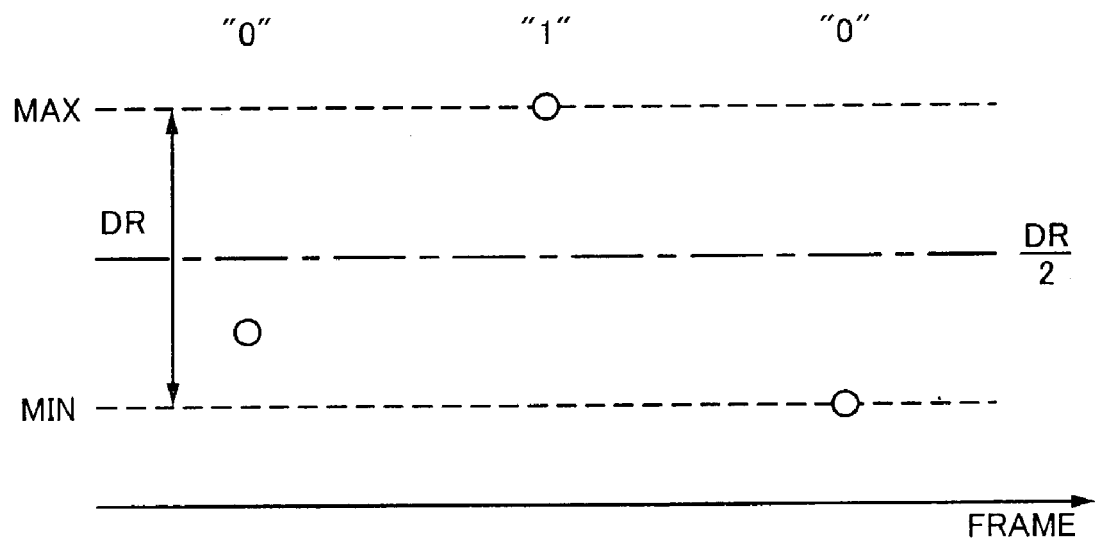
FIG. 23 is a schematic diagram for explaining the operation of the feature detecting circuit.

An output (DR/2) of which the dynamic range DR is divided by 2 is supplied from a bit shifting circuit 124 to the comparing circuit 123. The comparing circuit 123 detects the relation of each pixel value Px and DR/2. As shown in FIG. 23, when the pixel value Px is larger than DR/2, the compared output of one bit of the comparing circuit 123 becomes "1". Otherwise, the compared output of one bit of the comparing circuit 123 becomes "0". The comparing circuit 123 arranges in parallel the compared outputs of the plurality of pixels as class taps and generates an ADRC output of 13 bits or 9 bits.

In addition, the dynamic range DR is supplied to a "number of bits" converting circuit 125. The "number of bits" converting circuit 125 converts eight bits of the dynamic range DR into for example five bits by quantization. The converted dynamic range and the ADRC output are supplied as class code to the coefficient ROM 225.

Of course, when multi-bit ADRC is performed instead of one-bit ADRC, a feature of a considered pixel can be more finely categorized as a class.

Figure 24:
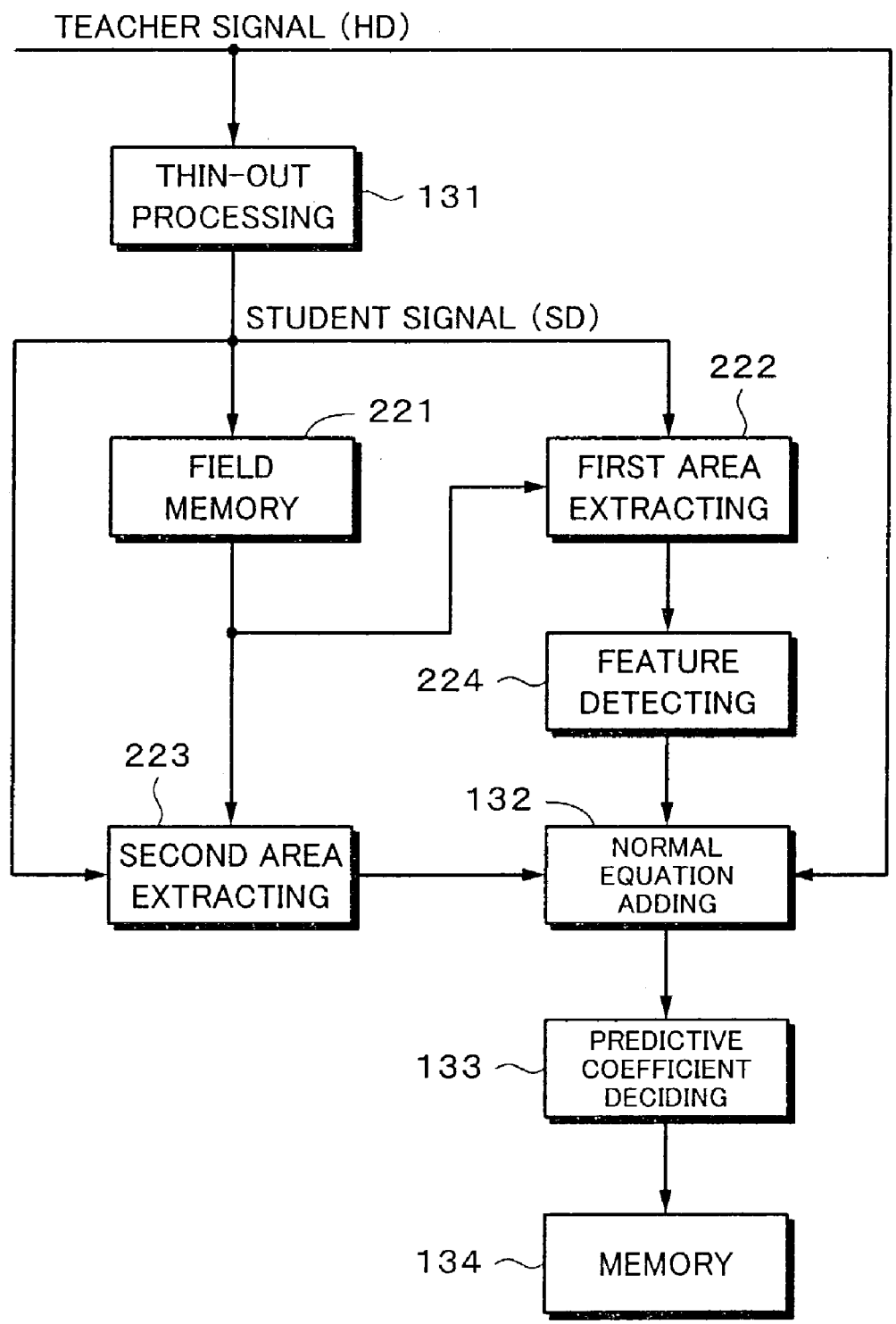
FIG. 24 is a block diagram showing the structure in which a learning is performed to generate coefficient data used in the resolution converting portion using the class categorizing adaptive process.

Next, with reference to FIG. 24, a learning process (namely, a process for obtaining predictive coefficients stored in the coefficient ROM 225) will be described. For simplicity, in FIG. 24, similar structural portions to those of the class categorizing adaptive process resolution converting circuit 112 shown in FIG. 20 will be denoted by similar reference numerals.

An HD picture signal used for a learning (this signal is referred to as teacher signal) is supplied to a thin-out processing portion 131 and a normal equation adding portion 132. The thin-out processing portion 131 performs a thin-out process for the HD picture signal, generates an SD picture signal (referred to as student signal), and supplies the generated student signal to a field memory 221. As was described with reference to FIG. 20, the field memory 221 stores a student signal of the chronologically preceding field.

On the next stage of the field memory 221, almost the same process as that described with reference to FIG. 20 is performed except that class code generated by a feature detecting portion 224 and predictive taps extracted by a second area extracting portion 223 are supplied to a normal equation adding portion 132. A teacher signal is also supplied to the normal equation adding portion 132. To generate coefficients using the three types of inputs, the normal equation adding portion 132 performs a process for generating a normal equation. A predictive coefficient deciding portion 133 decides predictive coefficients for each class code using the normal equation. The predictive coefficient deciding portion 133 supplies the decided predictive coefficients to a memory 134. The memory 134 stores the supplied predictive coefficients. The predictive coefficients stored in the memory 134 are the same as those stored in the coefficient ROM 225 (see FIG. 20).

Since the process for deciding predictive coefficients $w_1, \ldots,$ and $w_n$ for each class using the above-described formula (11) is the same as that using the formulas (2) to (8) according to the above-described embodiment, the description of the process will be omitted.

In such a manner, the class categorizing adaptive process resolution converting circuit 112 categorizes a feature of a considered pixel of an SD picture as a class, performs an estimating calculation using prepared predictive coefficients corresponding to the categorized class, and thereby generates a plurality of pixels of an HD picture corresponding to the considered pixel.

Thus, since predictive coefficients that accurately correspond to a feature of a considered pixel of an SD picture can be selected, when an estimating calculation is performed using such predictive coefficients, a plurality of pixels of an HD picture corresponding to a considered pixel can be adequately generated. In addition, even if an input picture signal has a motion, a converted picture signal that less deteriorates can be obtained.

Thus, in the class categorizing adaptive process resolution converting circuit 112, a converted picture signal that less deteriorates can be obtained regardless of whether an input picture is a still picture or a moving picture. However, as was described above, when an input picture signal is a perfect still portion or a simple moving portion such as a pan or a tilt, a converted picture signal that is output from the class categorizing adaptive process resolution converting circuit 112 is inferior to a converted picture signal that is output from the high density storage resolution converting circuit 111 that can store information of a long frame.

According to the other embodiment, using the characteristics of the two resolution converting circuits 111 and 112, an output picture signal whose resolution has been converted can be obtained from the output selecting portion 113 in such a manner that the output picture signal less deteriorates. In the output selecting portion 113, the determining circuit 114 determines which of the two resolution converted outputs is selected. The output selecting portion 113 controls the selecting circuit 115 so that it adequately outputs a picture signal whose resolution has been adequately converted corresponding to the determined output.

Next, returning to FIG. 15, the detail of the determining circuit 114 and a selecting operation corresponding to the determined result will be described.

In the determining circuit 114, a converted picture signal that is output from the high density storage resolution converting circuit 111 and a converted picture signal that is output from the class categorizing adaptive process resolution converting circuit 112 are supplied to a difference value calculating circuit 241. The difference value calculating circuit 241 calculates the difference value. An absolute value calculating circuit 242 calculates the absolute value of the difference value and supplies the absolute value to a comparing and determining circuit 243.

The comparing and determining circuit 243 determines whether or not the absolute value of the difference value that is output from the absolute value calculating circuit 242 is larger than a predetermined value and supplies the determined result to a selection signal generating circuit 249.

When the determined result of the comparing and determining circuit 243 represents that the absolute value of the difference value that is output from the absolute value calculating circuit 242 is larger than the predetermined value, the comparing and determining circuit 243 supplies the determined result to the selection signal generating circuit 249. At that point, the selection signal generating circuit 249 generates a selection control signal that causes the selecting circuit 115 to select a picture signal whose resolution has been converted, the picture signal being supplied from the class categorizing adaptive process resolution converting circuit 112. The selection signal generating circuit 249 supplies the selection control signal to the selecting circuit 115.

Such a selection is performed because of the following reason. In other words, as was described above, in the high density storage resolution converting circuit 111, when an input picture signal is a still picture or a moving picture having a simple pan or a simple tilt, a converted picture signal less deteriorates. In contrast, when an input picture signal is a moving picture that has a rotation or a deformation or a moving picture that has a moving object, a converted picture signal deteriorates. Thus, when the level of output pixels of a converted picture signal that is output from the high density storage resolution converting circuit 111 and the level of output pixels of a converted picture signal that is output from the class categorizing adaptive process resolution converting circuit 112 are remarkably different, it is likely that the difference results from the deterioration of the picture signal.

Thus, when the absolute value of the difference value calculated by the difference value calculating circuit 241 is larger than the predetermined threshold value, it is preferred to use a converted picture signal that is output from the class categorizing adaptive process resolution converting circuit 112 that can deal with a picture having a motion. Thus, as is clear from the above description, the difference value calculating circuit 241, the absolute value calculating circuit 242, and the comparing and determining circuit 243 compose a still picture—moving picture determining circuit.

When the determined result of the comparing and determining circuit 243 represents that the absolute value of the difference value that is output from the absolute value calculating circuit 242 is smaller than the predetermined value, as will be described in the following, the selection signal generating circuit 249 generates a selection control signal that causes a pixel of the converted picture signal that is output from the high density storage resolution converting circuit 111 or a pixel of the converted picture signal that is output from the class categorizing adaptive process resolution converting circuit 112 to be output from the selecting circuit 115 selected whichever the pixel has a larger activity. The selection signal generating circuit 249 supplies the generated selection control signal to the selecting circuit 115. Since a pixel with a higher activity is output, a picture having a larger activity that is not unsharp can be output.

In the example, as a criterion of activity, a dynamic range of a predetermined area of a plurality of pixels preceded and followed by a considered pixel of an SD picture is used against a resolution converted output picture signal that is an HD equivalent picture.

Thus, in the determining circuit 114, the converted picture signal that is output from the high density storage resolution converting circuit 111 and the converted picture signal that is output from the class categorizing adaptive process resolution converting circuit 112 are supplied to the area extracting portions 244 and 245 that extract areas in which activities are calculations, respectively.

Figure 25A:
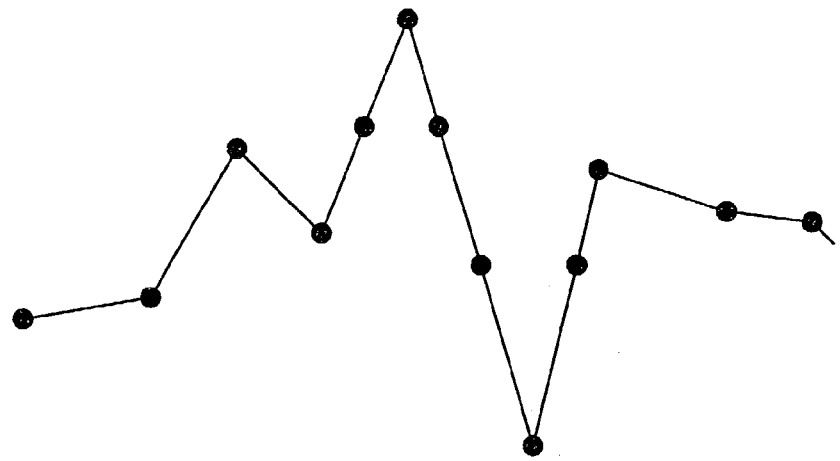
FIG. 25 is a schematic diagram for explaining a selecting process for an output picture signal according to the other embodiment.
Figure 25B:
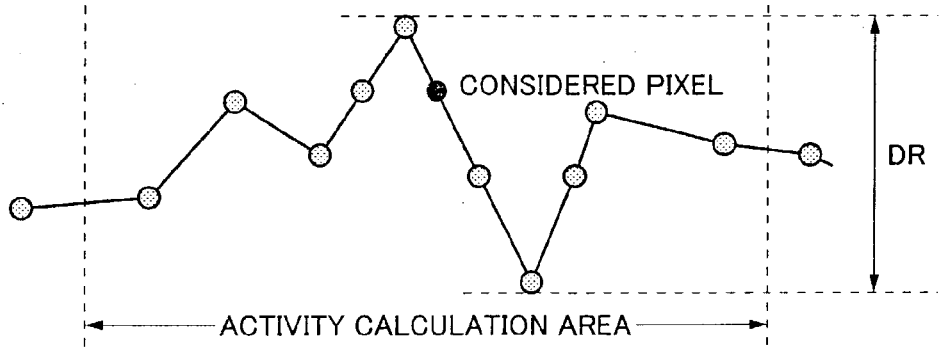
Figure 25C:
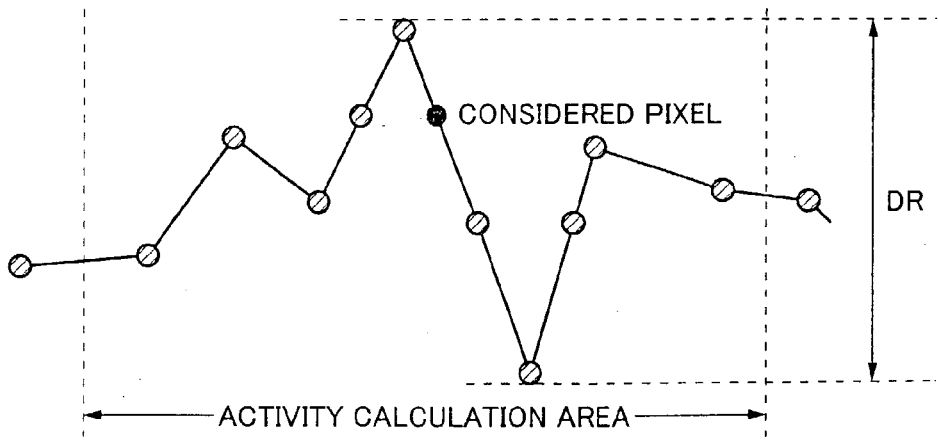

As denoted by broken lines of FIG. 25B and FIG. 25C, the area extracting portions 244 and 245 extract a plurality of pixels preceded and followed by a considered pixel of an SD picture as pixels in activity calculation areas against output picture signals of HD equivalent pictures from the high density storage resolution converting circuit 111 and the class categorizing adaptive process resolution converting circuit 112, respectively.

The plurality of pixels extracted as the areas in which the activities are calculated are supplied to detecting portions 246 and 247 that detect dynamic ranges as activities. The detecting portions 246 and 247 detect activities in the areas (in the example, dynamic ranges). The detected outputs are supplied to a comparing circuit 248. The dynamic ranges that are output from the detecting portions 246 and 247 are compared. The compared output is supplied to the selection signal generating circuit 249.

When the determined result of the comparing and determining circuit 243 represents that the absolute value of the difference value is smaller than the predetermined threshold value, the selection signal generating circuit 249 generates a selection control signal that causes a resolution converted picture signal with a larger dynamic range of a plurality of pixels extracted as an activity calculation area to be selected and output corresponding to the compared result that is output from the comparing circuit 248. The selection signal generating circuit 249 supplies the generated selection control signal to the selecting circuit 115.

Figure 26:
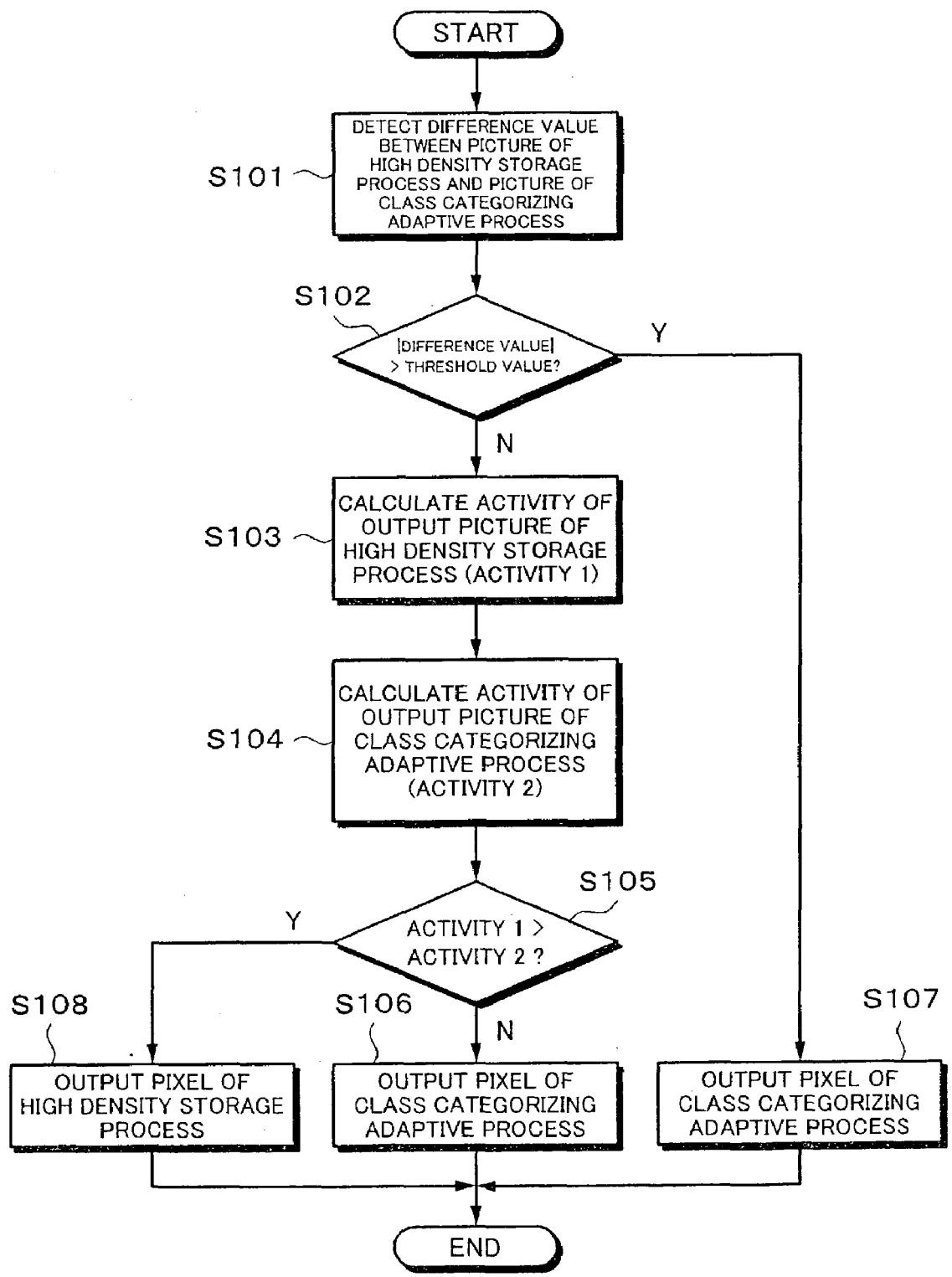
FIG. 26 is a flow chart for explaining the selecting process for the output picture signal according to the other embodiment.

Next, the operation of the determining circuit 114 and the selecting circuit 115 will be further described with reference to a flow chart shown in FIG. 26. The operation of the flow chart shown in FIG. 26 is equivalent to the case that the determining circuit 114 is accomplished by a software process. In the following description, an example of which a proper one of the output of the high density storage resolution converting circuit 111 and the output of the class categorizing adaptive process resolution converting circuit 112 is selected pixel by pixel will be described.

First of all, the difference value of corresponding pixels of both the outputs is calculated (at step S101). It is determined whether or not the absolute value of the difference value is larger than a predetermined threshold value (at step S102). When the absolute value is larger than the threshold value, the converted picture signal that is output from the class categorizing adaptive process resolution converting circuit 112 is selected and output (at step S107).

In contrast, when the absolute value of the difference value is small, the activities (in this example, dynamic ranges) of both the outputs are calculated in the unit of the above-described activity calculation area (at steps S103 and S104). Thereafter, the calculated activities are compared (at step S105). A pixel with the larger activity is output (at steps S106 and S108). As a result, a picture having a larger activity (namely, that does not become unsharp) is selected and output.

In the above-described example, as the criterion of the activities, dynamic ranges in the predetermined areas surrounded by dotted liens shown in FIG. 25 were used. However, it should be noted that the present invention is not limited to such dynamic ranges. In other words, variance in a predetermined area, the sum of absolute values of difference values of a considered pixel and two pixels adjacent thereto, or the like may be used.

In the above example, the selecting process is performed pixel by pixel. However, it should be noted that the selecting process may be performed block by block, object by object, frame by frame, or the like.

In the above-described example, either an output of one high density storage type resolution converting circuit or an output of one class categorizing adaptive process resolution converting circuit is selected. Alternatively, a plurality of high density resolution converting circuits and/or a plurality of class categorizing adaptive process resolution converting circuit may be disposed and an output picture signal may be selected therefrom.

Class taps and predictive taps of the first area extracting portion 222 and the second area extracting portion 223 described in the section of the class categorizing adaptive process are just an example. In other words, it is clear that the present invention is not limited to such class taps and predictive taps. In addition, in the above description, the structure of class taps is the same as the structure of predictive taps. Alternatively, the structure of class taps may be different from the structure of predictive taps.

In the above-described embodiment, a conversion from an SD picture into an HD picture was exemplified. However, the present invention is not limited to such a conversion. Instead, the present invention can be applied to a conversion for a variety of resolutions. In addition, the present invention is not limited to the above-described class categorizing adaptive process and high density storage.

Figure 27:
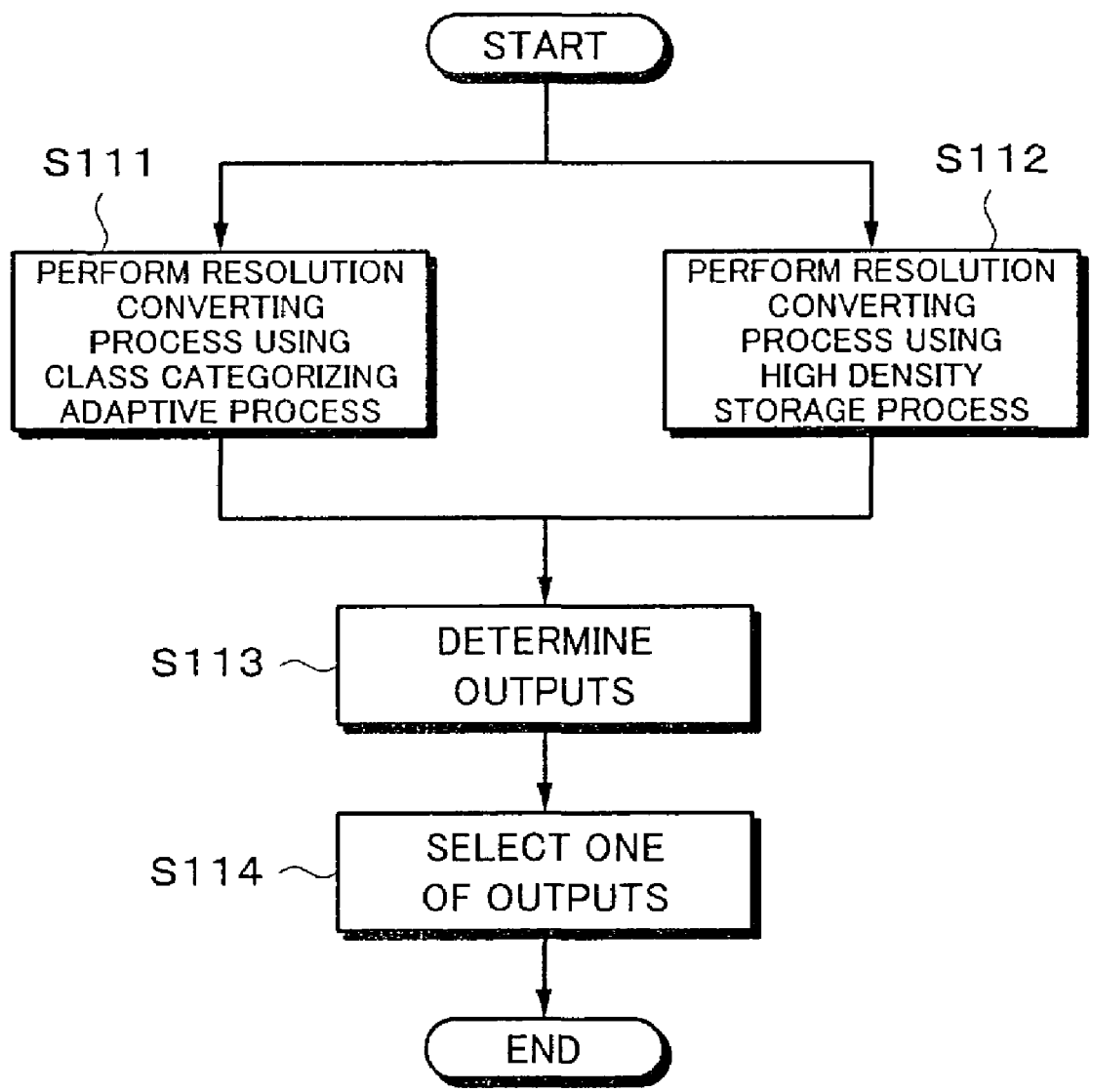
FIG. 27 is a flow chart for explaining a process of which the other embodiment of the present invention is accomplished by software.

The other embodiment of the present invention can be accomplished by software as well as hardware. Next, a software process that accomplishes the other embodiment of the present invention will be described. FIG. 27 is a flow chart showing a resolution converting process according to an embodiment of the present invention. At steps S111 and S112, a resolution converting process using a class categorizing adaptive process and a resolution converting process using a high density storage process are performed in parallel. Outputs of the individual processes are processed by an output determining process (at step S113). Corresponding to the determined result at step S113, at step S114, one of the outputs is selected. As a result, the process for one pixel is completed.

Figure 28:
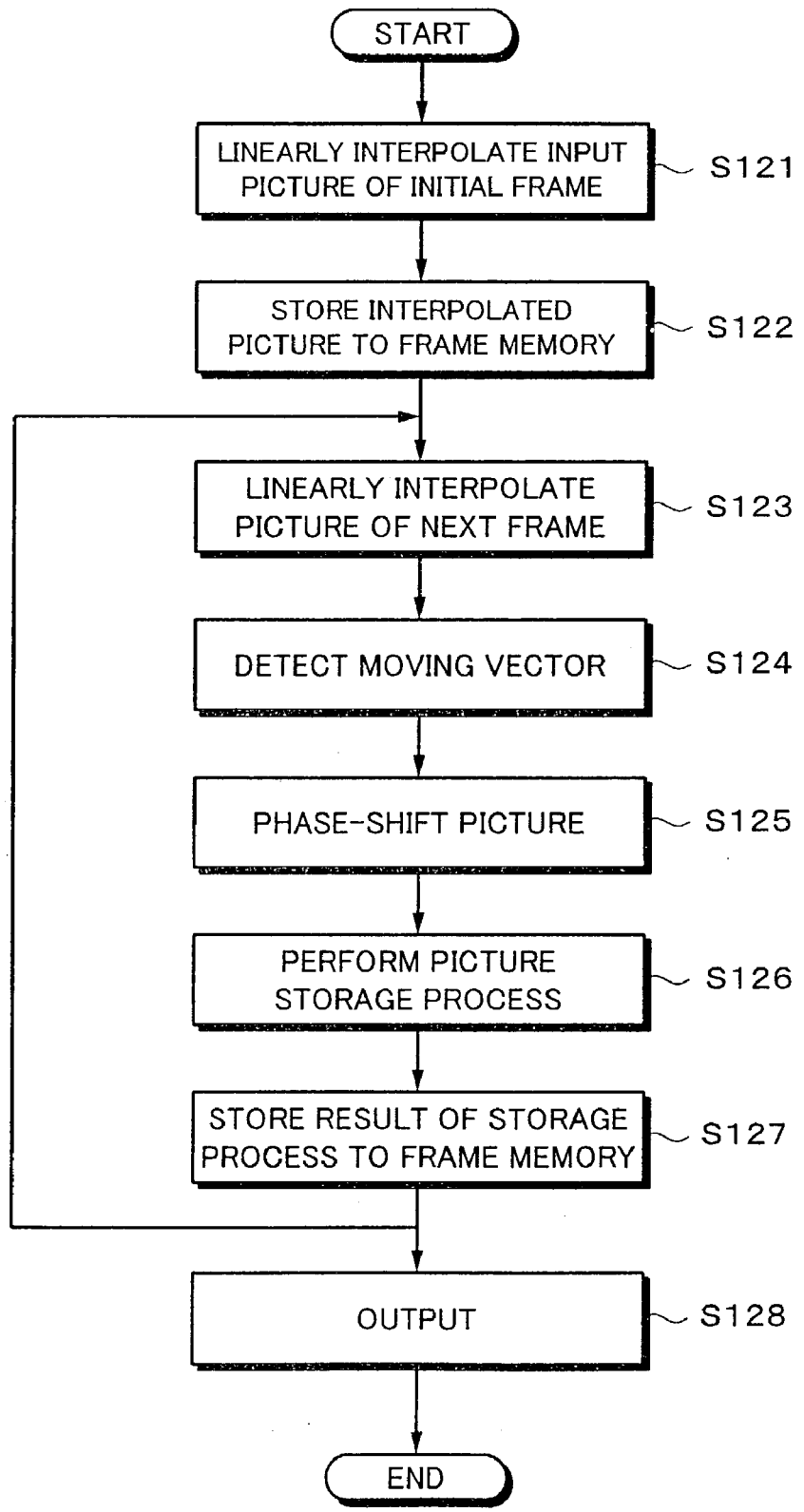
FIG. 28 is a flow chart showing a converting process of the resolution converting portion using the storage type process.

FIG. 28 is a flow chart showing the resolution converting process using the high density storage process at step S112. First of all, at step S121, an input picture of an initial frame is linearly interpolated so as to form a picture having pixels of a HD picture. The picture that has been interpolated is stored in a frame memory (at step S122). At step S123, likewise, an input picture of the next frame is linearly interpolated. At step S124, using the pictures of the two frames that have been linearly interpolated, a moving vector is detected.

At step S125, the input SD picture is phase-shifted corresponding to the detected moving vector. The picture storage process is performed for the picture that has been phase-shifted (at step S126). At step S127, the result of the storage process is stored to the frame memory. Thereafter, the picture is output from the frame memory (at step S128).

Figure 29:
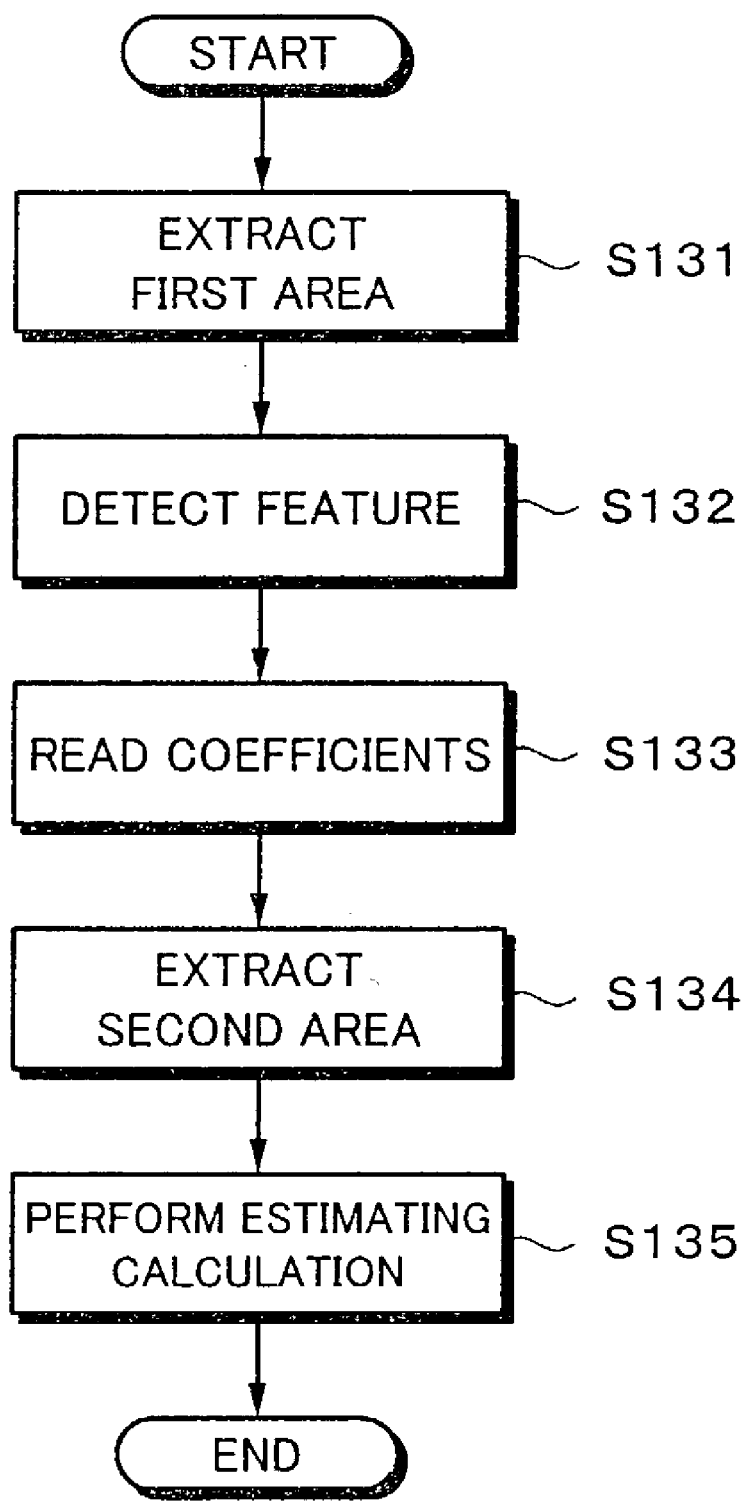
FIG. 29 is a flow chart showing the resolution converting process using the class categorizing adaptive process.

FIG. 29 is a flow chart showing the detail of the resolution converting process using the class categorizing adaptive process at step S111. First of all, at step S131, a first area is extracted. In other words, class taps are extracted. At step S132, a feature detecting process is performed for the extracted class taps. Coefficients corresponding to the detected feature are read from coefficients that have been learnt (at step S133). At step S134, a second area (as predictive taps) is extracted. At step S135, an estimating calculation is performed using the coefficients and predictive taps. As a result, an output of which the resolution has been upconverted (HD picture) is obtained.

Figure 30:
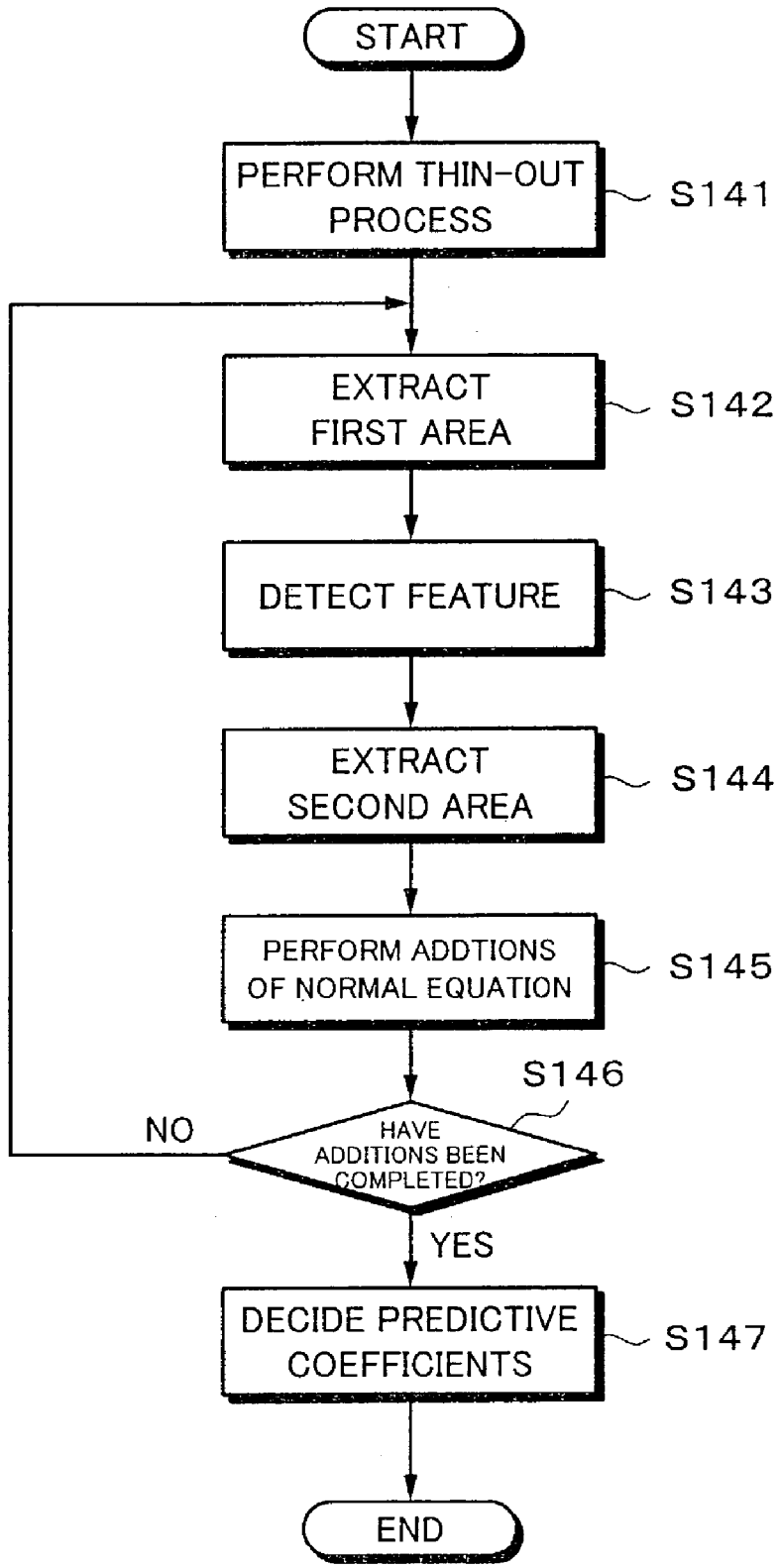
FIG. 30 is a flow chart showing a process in which a learning is performed to generate coefficient data used in the resolution converting process using the class categorizing adaptive process.

FIG. 30 is a flow chart showing a learning process for obtaining coefficients used in the resolution converting process using the class categorizing adaptive process. At step S141, a thin-out process is performed for an HD signal with a high resolution (this signal is referred to as teacher signal). As a result, a student signal is generated. At step S142, a first area (as class taps) is extracted from the student signal. Corresponding to the extracted class taps, a feature is detected (at step S143). At step S144, a second area (as predictive taps) is extracted. At step S145, data necessary for solving a normal equation with a solution of predictive coefficients is calculated using the teacher picture signal, data of predictive taps, and detected features.

At step S146, it is determined whether or not the additions of the normal equation has been completed. When the additions have not been completed, the flow returns to step S142 (first area extracting process). When the determined result represents that the process has been completed, at step S147, predictive coefficients are decided. The obtained predictive coefficients are stored to the memory. The predictive coefficients are used for the resolution converting process.

As was described above, according to the other embodiment of the present invention, since the result of the high density storage process that can handle long information in the chronological direction and the result of the class categorizing adaptive process can be selected pixel by pixel, a picture with high picture quality that less deteriorates can be output.

The present invention is not limited to the above-described embodiments. In other words, various modifications and applications are available without departing from the spirit of the present invention.

The invention claimed is:

1. A picture processing apparatus for receiving an input picture signal and generating an output picture signal with higher quality than the input picture signal, comprising:

first signal processing means, having storing means for storing a picture signal with the same quality as the output picture signal, said first signal processing means adding the input picture signal and the picture signal stored in said storing means so as to generate a first picture signal with higher quality than the input picture and store the first picture signal to said storing means;

second signal processing means for extracting a feature of the input picture signal corresponding to the position of a considered pixel of the output picture signal, categorizing the considered pixel as one of a plurality of classes corresponding to the feature, and calculating the input picture signal using a predetermined calculating method corresponding to the categorized class so as to generate a second picture signal with higher quality than the input picture signal; and output selecting means for performing a determination for the first picture signal and the second picture signal and selecting one of the first picture signal and the second picture signal as the output picture signal.

2. The picture processing apparatus as set forth in claim 1, wherein said first signal processing means cumulates picture signals of many frames that are chronologically successive so as to generate the first picture signal.

3. The picture processing apparatus as set forth in claim 1, wherein said second signal processing means has:

first extracting means for extracting first pixel data from the input picture signal corresponding to the position of the considered pixel of the second picture signal;

feature detecting means for detecting a feature of the first pixel data and categorizing the considered pixel as one of a plurality of classes corresponding to the feature;

second extracting means for extracting second pixel data from the input picture signal corresponding to the position of the considered pixel;

storing means for storing method information that designates a method for generating pixel data at the position of the considered pixel using the second pixel data for each class; and pixel generating means for generating data at the position of the considered pixel corresponding to the method information and the second pixel data.

4. The picture processing apparatus as set forth in claim 1, wherein determination information is generated corresponding to the first picture signal and the second picture signal and said output selecting means is controlled corresponding to the determination information.

5. The picture processing apparatus as set forth in claim 1, wherein a noise component of the output picture signal is smaller than a noise component of the input picture signal.

6. The picture processing apparatus as set forth in claim 5, wherein said first signal processing means weights the picture signal stored in said storing means and the input picture signal depending on whether the picture of the input picture signal is still or moving, adds the weighted picture signal and the weighted input picture signal and rewrites the picture signal stored in said storing means with the added output so as to generate as the added output a first picture signal from which noise has been eliminated, wherein said second signal processing means extracts pixels at corresponding positions of pictures of a plurality of frames, categorizes a noise component of the pixels corresponding to the variation of the pixels among the frames as a class that is the feature and performs a predetermined calculating process corresponding to the categorized class so as to generate a second picture signal of which the noise component has been eliminated from the input picture signal, and wherein said output selecting means determines whether the picture is still or moving in the unit of a predetermined number of pixels corresponding to the first picture signal and the second picture signal, selects one of the first picture signal and the second picture signal in the unit of the predetermined number of pixels corresponding to the determined result, and outputs the selected one of the first picture signal and the second picture signal.

7. The picture processing apparatus as set forth in claim 6, wherein said output selecting portion has:

a determining portion for determining whether the predetermined number of pixels is a still portion or a moving portion of a picture, and a selecting portion for selecting the first picture signal for pixels of the still portion and the second picture signal for pixels of the moving portion corresponding to the determined result of said determining portion and outputting the selected one of the first picture signal and the second picture signal.

8. The picture processing apparatus as set forth in claim 7, wherein said determining portion has:

a difference value calculating portion for calculating the difference value between the first picture signal and the second picture signal in the unit of the predetermined number of pixels; and a comparing portion for outputting a determination value that represents that the pixels are the moving portion when the compared result represents that the absolute value of the difference value is equal to or larger than a predetermined threshold value and for outputting another determination value that represents that the pixels are the still portion when the compared result represents that the absolute value of the difference value is smaller than the predetermined threshold value.

9. The picture processing apparatus as set forth in claim 6, wherein said first signal processing means has:

a motion determining portion for determining whether the picture of the input picture signal is still or moving;

a weighting portion for weighting the input picture signal and the picture signal stored in said storing means corresponding to the determined result of said motion determining portion; and an adding portion for adding the weighted input picture signal and the weighted picture signal that is output from said storing means, and wherein the picture signal stored in said storing means is rewritten with the picture signal that is output from said adding portion.

10. The picture processing apparatus as set forth in claim 6, wherein said second signal processing means has:

a motion information detecting portion for detecting motion information of a considered pixel of the picture of the input picture signal;

a class tap extracting portion for extracting a plurality of pixels at corresponding positions of the considered pixel from a plurality of frames as class taps using the motion information detected by said motion information detecting portion;

a class categorizing portion for categorizing a noise component of the considered pixel as a class corresponding to a feature of the class taps extracted by said class tap extracting portion; and a calculation processing portion for designating a calculating process corresponding to the class categorized by said class categorizing portion and generating a picture signal from which the noise component of the considered pixel has been eliminated by the designated calculating process.

11. The picture processing apparatus as set forth in claim 10,
wherein the feature of the class taps used by said class categorizing portion is a distribution of noise components of the plurality of pixels as the class taps.

12. The picture processing apparatus as set forth in claim 10,
wherein said calculation processing portion calculates pixel values of a plurality of pixels at corresponding positions of the considered pixel with calculation coefficients pre-designated for the plurality of pixels corresponding to the class categorized by said class categorizing portion so as to generate a picture signal from which the noise component of the considered pixel has been eliminated.

13. The picture processing apparatus as set forth in claim 10,
wherein the calculation coefficients used by said calculation processing portion are predictive coefficients that are pre-obtained, the calculation coefficients being obtained as the predictive coefficients by the steps of:
extracting a considered pixel from teacher picture data whose noise is smaller than the input picture signal;
detecting motion information of the considered pixel from student picture data whose noise is equal to the input picture signal;
extracting a plurality of pixels at corresponding positions of the considered pixel as class taps from the student picture data of a plurality of frames corresponding to the motion information detected for the considered pixel;
categorizing the noise component of the considered pixel as a class corresponding to the feature of the class taps; and
obtaining predictive coefficients for generating an output signal with the same quality as a pixel equivalent to the considered pixel extracted from the teacher signal for each categorized class.

14. The picture processing apparatus as set forth in claim 1,
wherein the output picture signal has higher resolution than the input picture signal.

15. The picture processing apparatus as set forth in claim 14,
wherein while said first signal processing means references the motion between the picture of the picture signal stored in said storing means and the picture of the input picture signal and compensates the positions of the pixels thereof, said first signal processing means stores the input picture signal to said storing means so as to generate a first picture signal having the higher resolution in said storing means, and
wherein said second signal processing means detects the feature corresponding to a plurality of pixels including a considered pixel and pixels chronologically and spatially adjacent thereto and categorizes the feature as a class so as to generate a second picture signal having the higher resolution.

16. The picture processing apparatus as set forth in claim 15,
wherein said output selecting portion has:
a determining portion for determining the motions and the activities of the pictures of the first picture signal and the second picture signal in the unit of a predetermined number of pixels; and
a selecting portion for selecting one of the first picture signal and the second picture signal in the unit of a predetermined number of pixels corresponding to the determined result of said determining portion.

17. The picture processing apparatus as set forth in claim 16,
wherein said determining portion has:
a difference value calculating portion for calculating the difference value between the first picture signal and the second picture signal in the unit of the predetermined number of pixels; and
a comparing portion for outputting a determination value that represents that the predetermined number of pixels are the moving portion when the compared result represents that the absolute value of the difference value is equal to or larger than a predetermined threshold value and for outputting another determination value that represents that the predetermined number of pixels are the still portion when the compared result represents that the absolute value of the difference value is smaller than the predetermined threshold value.

18. The picture processing apparatus as set forth in claim 16,
wherein said determining portion has:
a still portion—moving portion determining portion for determining whether a picture is a sill portion or a moving portion in the unit of the predetermined number of pixels; and
a selection signal generating portion for supplying a signal that causes said selecting portion to select the second picture signal and output it when the determined result of said still portion—moving portion determining portion represents that a portion of the predetermined number of pixels is a moving portion.

19. The picture processing apparatus as set forth in claim 16,
wherein said determining portion has:
a still portion—moving portion determining portion for determining whether a picture is a sill portion or a moving portion in the unit of the predetermined number of pixels;
an activity determining portion for determining which of the picture of the first picture signal and the picture of the second picture signal has a higher activity than the other; and
a selection signal generating portion for supplying a signal that causes said selecting portion to select one of the first picture signal and the second picture signal whichever has a higher activity corresponding to the determined result of said activity determining means when the determined result of said still portion—moving portion determining portion represents that a portion of the predetermined number of pixels is a still portion.

20. The picture processing apparatus as set forth in claim 19,
wherein said activity determining portion calculates a dynamic range of pixel values of a plurality of pixels in a predetermined area of each of the first picture signal and the second picture signal and compares the two dynamic ranges that have been calculated so as to determine which of the first picture signal and the second picture signal has a higher activity.

21. The picture processing apparatus as set forth in claim 15,
wherein said first signal processing means has:
a motion detecting portion for detecting the motion between the picture of the picture signal stored in said storing means and the picture of the input picture signal; and
a picture storage processing portion for compensating the positions of pixels corresponding to the motion detected by said motion detecting portion, and adding the input picture signal to the picture signal stored in said storing means.

22. The picture processing apparatus as set forth in claim 15,
wherein said second signal processing means has:
a class tap extracting portion for extracting a plurality of pixels including a considered pixel of the picture of the input picture signal and pixels chronologically and spatially adjacent to the considered pixel as class taps;
a class categorizing portion for categorizing a feature of the class taps extracted by said class tap extracting portion as a class; and
a calculation processing portion for designating a picture conversion calculating process corresponding to the class categorized by said class categorizing portion and generating a plurality of pixels of the picture having the higher resolution corresponding to the considered pixel by the designated calculating process so as to generate the second picture signal.

23. The picture processing apparatus as set forth in claim 22,
wherein said class categorizing portion categorizes the feature of the class taps as a class corresponding to a pattern of pixel values of the plurality of pixels as the class taps.

24. The picture processing apparatus as set forth in claim 22,
wherein said calculation processing portion calculates a plurality of pixels in a predetermined area of the input picture signal corresponding to the class taps with calculation coefficients pre-designated for the plurality of pixels corresponding to the class categorized by said class categorizing portion so as to generate a plurality of pixels of the picture with the higher resolution corresponding to the considered pixel.

25. The picture processing apparatus as set forth in claim 24,
wherein the calculation coefficients used by said calculation processing portion are predictive coefficients that are pre-obtained, the calculation coefficients being obtained as the predictive coefficients by the steps of:
extracting a plurality of pixels corresponding to the considered pixel from a teacher signal with the same quality as the output picture signal;
extracting a plurality of pixels including the considered pixel and pixels chronologically and spatially adjacent thereto as class taps from a student signal with the same quality as the input picture signal;
categorizing a feature of the considered pixel as a class corresponding to the feature of the class taps; and
obtaining predictive coefficients for generating an output signal with the same quality as a pixel equivalent to the considered pixel extracted from the teacher signal using the student signal for each categorized class.

26. A picture processing method for receiving an input picture signal and generating an output picture signal with higher quality than the input picture signal, comprising the steps of:
storing a picture signal with the same quality as the output picture signal to storing means, adding the input picture signal and the picture signal stored in the storing means so as to generate a first picture signal with higher quality than the input picture and store the first picture signal to the storing means;
extracting a feature of the input picture signal corresponding to the position of a considered pixel of the output picture signal, categorizing the considered pixel as one of a plurality of classes corresponding to the feature, and calculating the input picture signal using a predetermined calculating method corresponding to the categorized class so as to generate a second picture signal with higher quality than the input picture signal; and
performing a determination for the first picture signal and the second picture signal and selecting one of the first picture signal and the second picture signal as the output picture signal.

27. The picture processing method as set forth in claim 26,
wherein the first signal processing step is performed by cumulating picture signals of many frames that are chronologically successive so as to generate the first picture signal.

28. The picture processing method as set forth in claim 26,
wherein the second signal processing step has steps of:
extracting first pixel data from the input picture signal corresponding to the position of the considered pixel of the second picture signal;
detecting a feature of the first pixel data and categorizing the considered pixel as one of a plurality of classes corresponding to the feature;
extracting second pixel data from the input picture signal corresponding to the position of the considered pixel;
storing method information that designates a method for generating pixel data at the position of the considered pixel using the second pixel data for each class; and
generating data at the position of the considered pixel corresponding to the method information and the second pixel data.

29. The picture processing method as set forth in claim 26,
wherein determination information is generated corresponding to the first picture signal and the second picture signal and one of the first picture signal and the second picture signal is selected as an output corresponding to the determination information.

30. The picture processing method as set forth in claim 26,
wherein a noise component of the output picture signal is smaller than a noise component of the input picture signal.

31. The picture processing method as set forth in claim 30,
wherein the first signal processing step is performed by weighting the picture signal stored in the storing means and the input picture signal depending on whether the picture of the input picture signal is still or moving, adding the weighted picture signal and the weighted input picture signal, and rewriting the picture signal stored in the storing means with the added output so as to generate as the added output a first picture signal from which noise has been eliminated, wherein the second signal processing step is performed by extracting pixels at corresponding positions of pictures of a plurality of frames, categorizing a noise component of the pixels corresponding to the variation of the pixels among the frames as a class that is the feature, and performing a predetermined calculating process corresponding to the categorized class so as to generate a second picture signal of which the noise component has been eliminated from the input picture signal, and wherein the output selecting step is performed by determining whether the picture is still or moving in the unit of a predetermined number of pixels corresponding to the first picture signal and the second picture signal, selecting one of the first picture signal and the second picture signal in the unit of the predetermined number of pixels corresponding to the determined result, and outputting the selected one of the first picture signal and the second picture signal.

32. The picture processing method as set forth in claim 31, wherein the output selecting step has the steps of:
determining whether the predetermined number of pixels is a still portion or a moving portion of a picture; and
selecting the first picture signal for pixels of the still portion and the second picture signal for pixels of the moving portion corresponding to the determined result at the determining step and outputting the selected one of the first picture signal and the second picture signal.

33. The picture processing method as set forth in claim 32, wherein the determining step has the steps of:
calculating the difference value between the first picture signal and the second picture signal in the unit of the predetermined number of pixels; and
outputting a determination value that represents that the pixels are the moving portion when the compared result represents that the absolute value of the difference value is equal to or larger than a predetermined threshold value and outputting another determination value that represents that the pixels are the still portion when the compared result represents that the absolute value of the difference value is smaller than the predetermined threshold value.

34. The picture processing method as set forth in claim 31, wherein the first signal processing step has the steps of:
determining whether the picture of the input picture signal is still or moving;
weighting the input picture signal and the picture signal stored in the storing means corresponding to the determined result at the motion determining step; and
adding the weighted input picture signal and the weighted picture signal that is output from the storing means, and
wherein the picture signal stored in the storing means is rewritten with the picture signal that is output at the adding step.

35. The picture processing method as set forth in claim 31, wherein the second signal processing step has the steps of:
detecting motion information of a considered pixel of the picture of the input picture signal;
extracting a plurality of pixels at corresponding positions of the considered pixel from a plurality of frames as class taps using the motion information detected at the motion information detecting step;
categorizing a noise component of the considered pixel as a class corresponding to a feature of the class taps extracted at the class tap extracting step; and
designating a calculating process corresponding to the class categorized at the class categorizing step and generating a picture signal from which the noise component of the considered pixel has been eliminated by the designated calculating process.

36. The picture processing method as set forth in claim 35, wherein the feature of the class taps used at the class categorizing step is a distribution of noise components of the plurality of pixels as the class taps.

37. The picture processing method as set forth in claim 35, wherein the calculation processing step is performed by calculating pixel values of a plurality of pixels at corresponding positions of the considered pixel with calculation coefficients pre-designated for the plurality of pixels corresponding to the class categorized at the class categorizing step so as to generate a picture signal from which the noise component of the considered pixel has been eliminated.

38. The picture processing method as set forth in claim 37, wherein the calculation coefficients are predictive coefficients that are pre-obtained by the steps of:
extracting a considered pixel from teacher picture data whose noise is smaller than the input picture signal;
detecting motion information of the considered pixel from student picture data whose noise is equal to the input picture signal;
extracting a plurality of pixels at corresponding positions of the considered pixel as class taps from the student picture data of a plurality of frames corresponding to the motion information detected for the considered pixel;
categorizing the noise component of the considered pixel as a class corresponding to the feature of the class taps; and
obtaining predictive coefficients for generating an output signal with the same quality as a pixel equivalent to the considered pixel extracted from the teacher signal for each categorized class.

39. The picture processing method as set forth in claim 26, wherein the output picture signal has higher resolution than the input picture signal.

40. The picture processing method as set forth in claim 39, wherein the first signal processing step is performed, while the motion between the picture of the picture signal stored in the storing means and the picture of the input picture signal is referenced and the positions of the pixels thereof are compensated, by storing the input picture signal to the storing means so as to generate a first picture signal having the higher resolution in the storing means,
wherein the second signal processing step is performed by detecting the feature corresponding to a plurality of pixels including a considered pixel and pixels chronologically and spatially adjacent thereto and categorizing the feature as a class so as to generate a second picture signal having the higher resolution, and
wherein the output selecting step is performed by selectively outputting one of the first picture signal and the second picture signal.

41. The picture processing method as set forth in claim 40, wherein the output selecting step has the steps of:
determining the motions and the activities of the pictures of the first picture signal and the second picture signal in the unit of a predetermined number of pixels; and
selecting one of the first picture signal and the second picture signal in the unit of a predetermined number of pixels corresponding to the determined result at the determining step.

42. The picture processing method as set forth in claim 41, wherein the determining step has the steps of:
calculating the difference value between the first picture signal and the second picture signal in the unit of the predetermined number of pixels; and
outputting a determination value that represents that the predetermined number of pixels are the moving portion when the compared result represents that the absolute value of the difference value is equal to or larger than a predetermined threshold value and outputting another determination value that represents that the predetermined number of pixels are the still portion when the compared result represents that the absolute value of the difference value is smaller than the predetermined threshold value.

43. The picture processing method as set forth in claim 41, wherein the determining step has the steps of:
determining whether a picture is a sill portion or a moving portion in the unit of the predetermined number of pixels; and
supplying a signal that causes the selecting portion to select the second picture signal and output it when the determined result at the still portion—moving portion determining step represents that a portion of the predetermined number of pixels is a moving portion.

44. The picture processing method as set forth in claim 41, wherein the determining step has the steps of:
determining whether a picture is a sill portion or a moving portion in the unit of the predetermined number of pixels;
determining which of the picture of the first picture signal and the picture of the second picture signal has a higher activity than the other; and
supplying a signal that causes the selecting portion to select one of the first picture signal and the second picture signal whichever has a higher activity corresponding to the determined result at the activity determining step when the determined result of the still portion—moving portion determining step represents that a portion of the predetermined number of pixels is a still portion.

45. The picture processing method as set forth in claim 44, wherein the activity determining step is performed by calculating a dynamic range of pixel values of a plurality of pixels in a predetermined area of each of the first picture signal and the second picture signal and comparing the two dynamic ranges that have been calculated so as to determine which of the first picture signal and the second picture signal has a higher activity.

46. The picture processing method as set forth in claim 40, wherein the first signal processing step has the steps of:
detecting the motion between the picture of the picture signal stored in the storing means and the picture of the input picture signal; and
compensating the positions of pixels corresponding to the motion detected at the motion detecting step, and adding the input picture signal to the picture signal stored in the storing means.

47. The picture processing method as set forth in claim 40, wherein the second signal processing step has the steps of:
extracting a plurality of pixels including a considered pixel of the picture of the input picture signal and pixels chronologically and spatially adjacent to the considered pixel as class taps;
categorizing a feature of the class taps extracted at the class tap extracting step as a class; and
designating a picture conversion calculating process corresponding to the class categorized at the class categorizing step and generating the picture signal having the higher resolution by the designated calculating process.

48. The picture processing method as set forth in claim 47, wherein the class categorizing step is performed by categorizing the feature of the class taps as a class corresponding to a pattern of pixel values of the plurality of pixels as the class taps.

49. The picture processing method as set forth in claim 47, wherein the calculation processing step is performed by calculating a plurality of pixels in a predetermined area of the input picture signal corresponding to the class taps with calculation coefficients pre-designated for the plurality of pixels corresponding to the class categorized at the class categorizing step so as to generate the output picture signal with the higher resolution corresponding to the considered pixel.

50. The picture processing method as set forth in claim 47, wherein the calculation coefficients used at the calculation processing step are predictive coefficients that are pre-obtained by the steps of:
extracting a plurality of pixels corresponding to the considered pixel from a teacher signal with the same quality as the output picture signal;
extracting a plurality of pixels including the considered pixel and pixels chronologically and spatially adjacent thereto as class taps from a student signal with the same quality as the input picture signal;
categorizing a feature of the considered pixel as a class corresponding to the feature of the class taps; and
obtaining predictive coefficients for generating an output signal with the same quality as a pixel equivalent to the considered pixel extracted from the teacher signal using the student signal for each categorized class.

51. A program for causing a computer to execute a picture process for generating an output picture signal with higher quality than an input picture signal, the picture process comprising the steps of:
storing a picture signal with the same quality as the output picture signal to storing means, adding the input picture signal and the picture signal stored in the storing means so as to generate a first picture signal with higher quality than the input picture and store the first picture signal to the storing means;
extracting a feature of the input picture signal corresponding to the position of a considered pixel of the output picture signal, categorizing the considered pixel as one of a plurality of classes corresponding to the feature, and calculating the input picture signal using a predetermined calculating method corresponding to the categorized class so as to generate a second picture signal with higher quality than the input picture signal; and
performing a determination for the first picture signal and the second picture signal and selecting one of the first picture signal and the second picture signal as the output picture signal.

52. A computer readable record medium on which a program has been recorded, the program causing the computer to execute a picture process for generating an output picture signal with higher quality than an input picture signal, the picture process comprising the steps of:
storing a picture signal with the same quality as the output picture signal to storing means, adding the input picture signal and the picture signal stored in the storing means so as to generate a first picture signal with higher quality than the input picture and store the first picture signal to the storing means;

extracting a feature of the input picture signal corresponding to the position of a considered pixel of the output picture signal, categorizing the considered pixel as one of a plurality of classes corresponding to the feature, and calculating the input picture signal using a predetermined calculating method corresponding to the categorized class so as to generate a second picture signal with higher quality than the input picture signal; and performing a determination for the first picture signal and the second picture signal and selecting one of the first picture signal and the second picture signal as the output picture signal.

* * * * *